(12) United States Patent
Kim

(10) Patent No.: US 12,439,347 B2
(45) Date of Patent: Oct. 7, 2025

(54) SIDELINK COMMUNICATION METHOD AND APPARATUS

(71) Applicant: ELECTRONICS AND TELECOMMUNICATIONS RESEARCH INSTITUTE, Daejeon (KR)

(72) Inventor: Tae Joong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 472 days.

(21) Appl. No.: 17/974,348

(22) Filed: Oct. 26, 2022

(65) Prior Publication Data

US 2023/0128351 A1 Apr. 27, 2023

(30) Foreign Application Priority Data

Oct. 27, 2021 (KR) .................. 10-2021-0144842
Oct. 25, 2022 (KR) .................. 10-2022-0138528

(51) Int. Cl.
*H04W 52/38* (2009.01)
*H04W 52/54* (2009.01)

(52) U.S. Cl.
CPC ......... *H04W 52/383* (2013.01); *H04W 52/54* (2013.01)

(58) Field of Classification Search
CPC ... H04W 52/383; H04W 52/54; H04W 52/16; H04W 52/367; H04W 52/10; H04W 52/325; H04W 52/32; H04W 52/247; H04W 72/0473; H04W 52/34; H04W 72/23; H04W 52/04; H04W 52/226; H04W 52/18; H04W 52/36; H04J 13/0077; H04J 13/00
See application file for complete search history.

(56) References Cited

U.S. PATENT DOCUMENTS

| 2017/0303215 A1* | 10/2017 | Kim ................. H04W 52/367 |
| 2021/0006318 A1 | 1/2021 | Kim et al. |
| 2021/0022084 A1 | 1/2021 | Jiang |
| 2021/0051600 A1 | 2/2021 | Fakoorian et al. |
| 2021/0144655 A1 | 5/2021 | Li et al. |
| 2021/0195576 A1* | 6/2021 | Balasubramanian ................. H04W 52/383 |

(Continued)

FOREIGN PATENT DOCUMENTS

| WO | 2020/222460 A1 | 11/2020 |
| WO | 2021/026570 A1 | 2/2021 |
| WO | 2021/090295 A1 | 5/2021 |

*Primary Examiner* — Lana N Le
(74) *Attorney, Agent, or Firm* — Rabin & Berdo, P.C.

(57) ABSTRACT

A sidelink communication method, performed by a first terminal, may comprise: determining a first power value of a first control channel for transmitting control information for sidelink communication based on open-loop power control; transmitting the control information on the first control channel having the first power value; in response to receiving a response signal corresponding to the control information, determining a second power value of a first data channel for transmitting data; and transmitting a second control channel and the first data channel in one predetermined slot for the sidelink communication, wherein a third power value of the second control channel and the second power value of the first data channel are determined based on at least a power value of the first control channel.

14 Claims, 13 Drawing Sheets

(56) References Cited

U.S. PATENT DOCUMENTS

| | | |
|---|---|---|
| 2021/0235396 A1 | 7/2021 | Jung et al. |
| 2021/0320759 A1 | 10/2021 | Lee et al. |
| 2023/0126206 A1* | 4/2023 | Elshafie .............. H04W 52/383 |
| 2024/0251403 A1* | 7/2024 | Chen ................... H04W 52/146 |
| 2024/0340814 A1* | 10/2024 | Keating ............. H04W 52/367 |
| 2024/0430808 A1* | 12/2024 | Abotabl ................ H04W 52/24 |

* cited by examiner

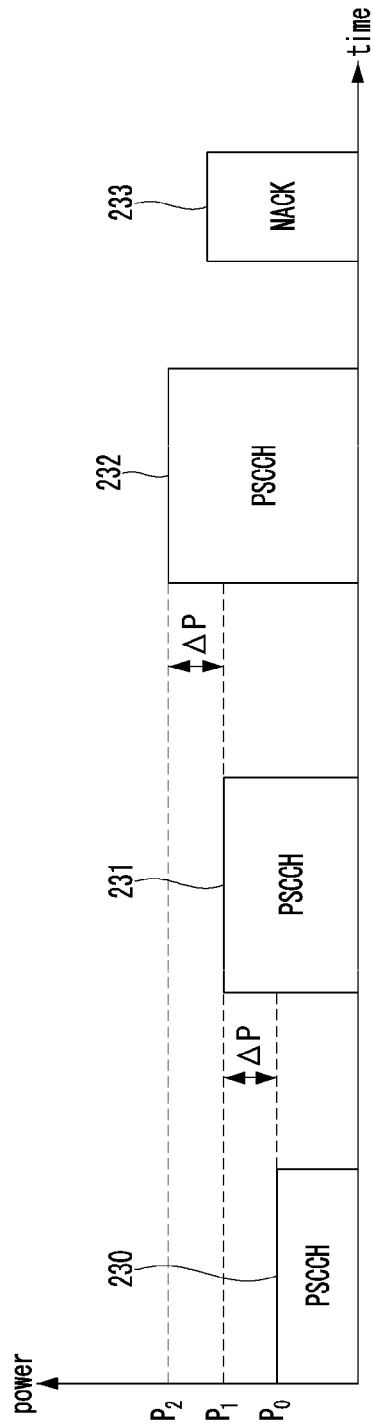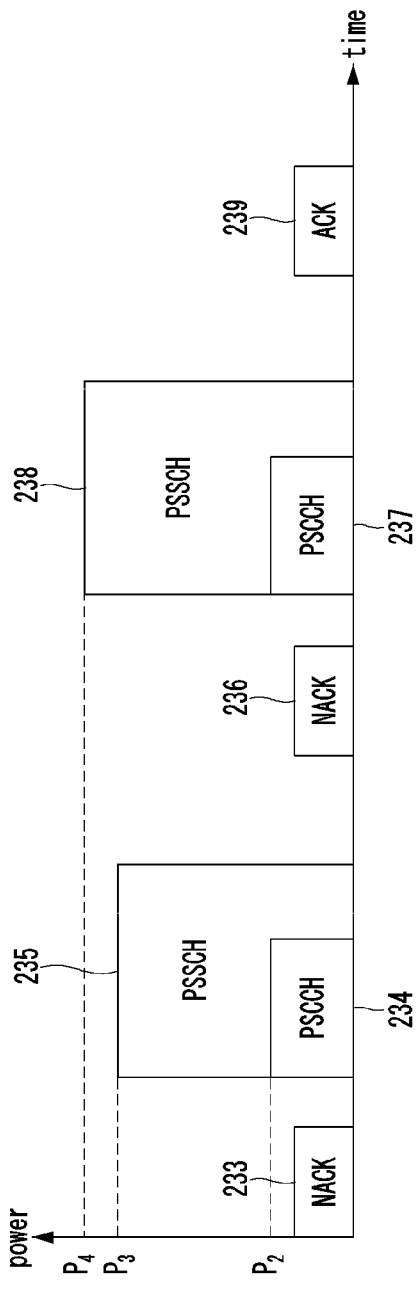

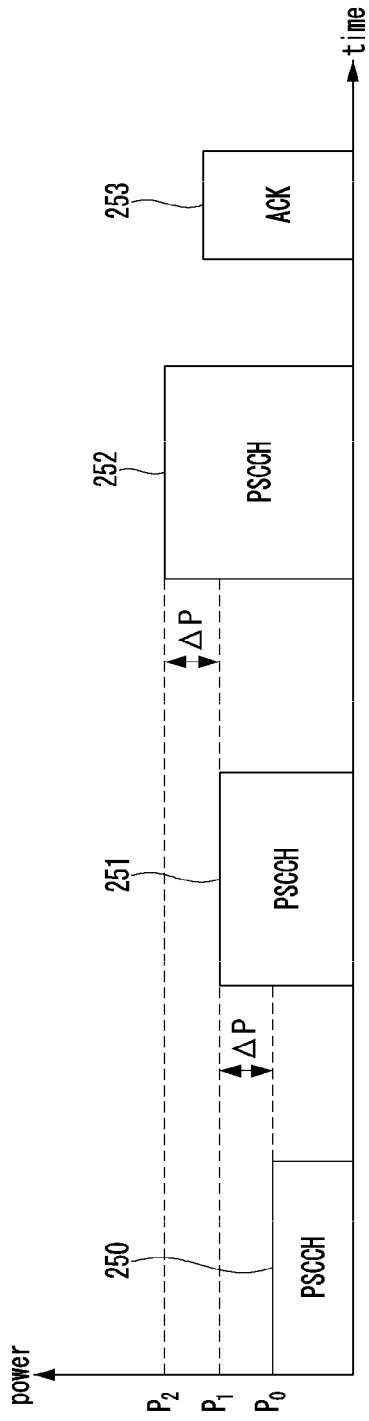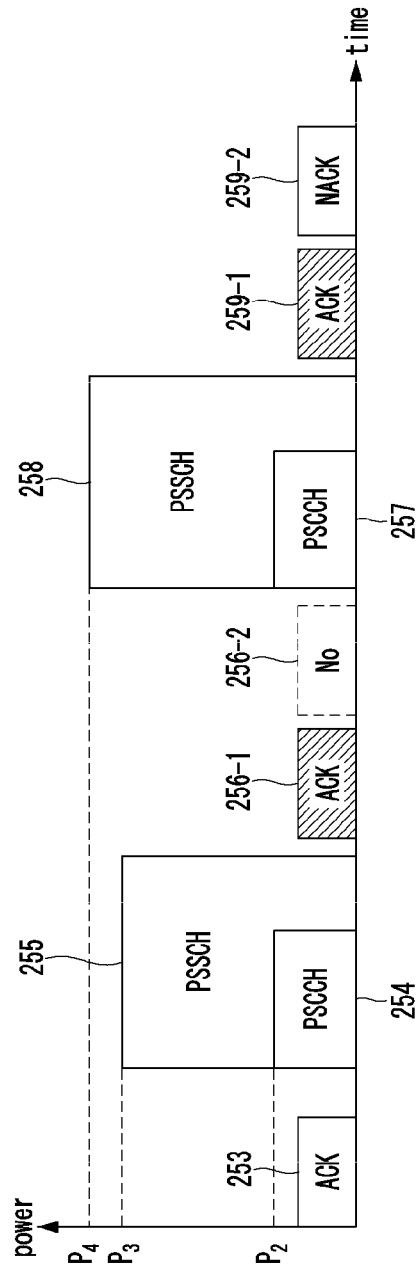

FIG. 14

| No. | TX UE Sidelink Channels | Feedback (PSCCH / PSSCH) | | | $N_C/N_D/K$ |
|---|---|---|---|---|---|
| | | RX UE#0 | RX UE#1 | RX UE#2 | |
| 1 | PSCCH | -/- | -/- | -/- | 0/0/0 |
| 2 | PSCCH | ACK/- | -/- | -/- | 1/0/0 |
| 3 | PSCCH + PSSCH | ACK/- | ACK/ACK | -/- | 2/1/1 |
| 4 | PSCCH + PSSCH | ACK/ACK | N/A | ACK/- | 2/1/2 |
| 5 | PSCCH + PSSCH | N/A | N/A | ACK/ACK | 1/1/3 |
| ∴ The sidelink transmission procedure for groupcast may be completed when NC-ND=0 and K (=the number of ACKed PSSCHs) is the number of RX UEs within a group. | | | | | |

FIG. 15

| No. | TX UE Sidelink Channels | Feedback (PSCCH / PSSCH) | | | $N_C/N_D/K$ |
|---|---|---|---|---|---|
| | | RX UE#0 | RX UE#1 | RX UE#2 | |
| 1 | PSCCH | -/- | -/- | -/- | 0/0/0 |
| 2 | PSCCH | ACK/- | -/- | -/- | 1/0/0 |
| 3 | PSCCH + PSSCH | ACK/ACK | -/- | -/- | 1/1/1 |
| 4 | PSCCH | N/A | ACK/- | -/- | 1/0/1 |
| 5 | PSCCH + PSSCH | N/A | ACK/ACK | ACK/- | 2/1/2 |
| 6 | PSCCH + PSSCH | N/A | N/A | ACK/ACK | 1/1/3 |
| ∴ The sidelink transmission procedure for groupcast may be completed when NC-ND=0 and K (=the number of ACKed PSSCHs) is the number of RX UEs within a group.<br>∴ When RX UE of ACKed PSCCH is present, TX UE may transmit only a PSCCH in the next resource (e.g., No. 4) | | | | | |

SIDELINK COMMUNICATION METHOD AND APPARATUS

CROSS-REFERENCE TO RELATED APPLICATIONS

This application claims priority to Korean Patent Applications No. 10-2021-0144842 filed on Oct. 27, 2021, and No. 10-2022-0138528 filed on Oct. 25, 2022 with the Korean Intellectual Property Office (KIPO), the entire contents of which are hereby incorporated by reference.

BACKGROUND

1. Technical Field

The present disclosure relates to sidelink communication providing direction communication between terminals, and more particularly, to a method and an apparatus for open-loop power control through a transmit power ramping of sidelink control channels.

2. Related Art

In 2016, the International Telecommunication Union-Radiocommunication sector (hereafter 'ITU-R') announced the vision and requirements for the fifth generation mobile communication, and unlike the fourth generation mobile communication, requested the development of standards actually providing various services through three core services. The three core services comprise enhanced Mobile BroadBand (eMBB, hereinafter eMBB) that provides high-speed data, Ultra-Reliable and Low-Latency Communication (URLLC), and massive Internet-of-Things services (hereafter referred to as mMTC), and requirements are individually defined for each service. The reason ITU-R specified three core services as described above was to prepare for the convergence of numerous other industries and mobile communications in the 5G mobile communication era, and this was to be prepared in advance in the standard specifications.

In the fifth generation mobile communication, a method for providing reliable communication during sidelink communication is required.

SUMMARY

Accordingly, exemplary embodiments of the present disclosure are directed to providing a method and an apparatus for securing reliable sidelink communication through open-loop power control based on transmit power ramping of sidelink control channels (PSCCHs) in sidelink communication providing direction communication between terminals.

In addition, exemplary embodiments of the present disclosure are directed to providing a method and an apparatus for transmit power ramping of sidelink control channels.

In addition, exemplary embodiments of the present disclosure are directed to providing a method and an apparatus for resolving a problem of increasing power consumption of a terminal during sidelink communication.

In addition, exemplary embodiments of the present disclosure are directed to providing a method and an apparatus for high-speed transmit power ramping without increasing feedback resources during sidelink communication.

In addition, exemplary embodiments of the present disclosure are directed to providing a method and an apparatus for reducing an influence of uplink reception interference due to sidelink communication.

According to a first exemplary embodiment of the present disclosure, a sidelink communication method performed by a first terminal may comprise: determining a first power value of a first control channel for transmitting control information for sidelink communication based on open-loop power control; transmitting the control information on the first control channel having the first power value; in response to receiving a response signal corresponding to the control information, determining a second power value of a first data channel for transmitting data; and transmitting a second control channel and the first data channel in one predetermined slot for the sidelink communication, wherein a third power value of the second control channel and the second power value of the first data channel are determined based on at least a power value of the first control channel.

The second power value and the third power value may be determined by further using open-loop power control information at a time of transmitting the first data channel.

The sidelink communication method may further comprise transmitting the control information on a third control channel until a preset condition is satisfied when the response signal corresponding to the control information is not received, wherein a power value of the third control channel is increased by a predetermined value from the power value of the first control channel.

The preset condition may include a number of transmissions of a control channel.

The power value of the third control channel may be determined as a preset power value when the power value of the third control channel exceeds a preset maximum power in increasing the power value of the third control channel.

The response signal corresponding to the control information may include at least one of acknowledgment (ACK) indicating success of demodulation and decoding of the control information, or no signal indicating failure of demodulation and decoding of the control information.

In case of the no signal, the third power value may be increased by a predetermined value.

According to a second exemplary embodiment of the present disclosure, a sidelink communication method performed by a first terminal may comprise: transmitting control information for sidelink communication to a plurality of receiving terminals on a first control channel; in response to receiving a response signal corresponding to the first control channel from a first receiving terminal among the plurality of receiving terminals, transmitting a second control channel and a first data channel in one predetermined slot for the sidelink communication; in response to receiving a response signal corresponding to the second control channel and the first data channel from the first receiving terminal, and not receiving a response signal corresponding to the second control channel or a response signal corresponding to the second control channel and the first data channel from at least one of other receiving terminals, excluding the first receiving terminal from among terminals at which sidelink data is to be received; transmitting the control information on a third control channel; and in response to receiving a response signal corresponding to the third control channel from a second receiving terminal among the plurality of receiving terminals, transmitting a fourth control channel and a second data channel in one predetermined slot for the sidelink communication, wherein the first data channel and the second data channel transmit same sidelink data.

The sidelink communication method may further comprise: in response to receiving a response signal corresponding to the second control channel and the first data channel from the first receiving terminal, and receiving a response signal corresponding to the second control channel and the first data channel from a third receiving terminal, excluding the third receiving terminal from among terminals at which the sidelink data is to be received.

The sidelink communication method may further comprise: in response to receiving a response signal corresponding to the second control channel and the first data channel from the first receiving terminal and receiving a response signal to the second control channel from a third receiving terminal, transmitting a fifth control channel and a third data channel, wherein the third data channel transmits same sidelink data as the first data channel and the second data channel.

A first power value of the first control channel may be determined based on open-loop power control; a second power value of the first data channel, a third power value of the second control channel, and a fourth power value of the third control channel may be determined based on a transmit power of the first control channel; and a fifth power value of the fourth control channel and a sixth power value of the second data channel may be determined based on the fourth power value.

The sidelink communication method may further comprise, when there is no response from all of the plurality of receiving terminals, transmitting the control information on the third control channel until a preset condition is satisfied, wherein a power value of the third control channel is increased by a predetermined value from the power value of the first control channel.

The preset condition may include a number of transmissions of a control channel, and the power value of the third control channel may be determined as a preset power value when the power value of the third control channel exceeds a preset maximum power in increasing the power value of the third control channel.

According to a third exemplary embodiment of the present disclosure, a first terminal for sidelink communication may comprise: a sidelink receiver for receiving a sidelink signal from another terminal; a sidelink transmitter for transmitting a sidelink signal to another terminal; and a controller comprising at least one processor, wherein the controller is configured to: determine a first power value of a first control channel for transmitting control information for sidelink communication based on open-loop power control; control the sidelink transmitter to transmit the control information on the first control channel having the first power value; in response to receiving a response signal corresponding to the control information through the sidelink receiver, determine a second power value of a first data channel for transmitting data; and control the sidelink transmitter to transmit a second control channel and the first data channel in one predetermined slot for the sidelink communication, wherein a third power value of the second control channel and the second power value of the first data channel are determined based on at least a power value of the first control channel.

The controller may be configured to determine the second power value and the third power value by further using open-loop power control information at a time of transmitting the first data channel.

The controller may be further configured to: control the sidelink transmitter to transmit the control information on a third control channel until a preset condition is satisfied when the response signal corresponding to the control information is not received, and increase a power value of the third control channel by a predetermined value from the power value of the first control channel.

The preset condition may include a number of transmissions of a control channel.

The controller may be further configured to determine the power value of the third control channel as a preset power value when the power value of the third control channel exceeds a preset maximum power in increasing the power value of the third control channel.

The response signal corresponding to the control information may include at least one of acknowledgment (ACK) indicating success of demodulation and decoding of the control information, or no signal indicating failure of demodulation and decoding of the control information.

In case of the no signal, the third power value may be increased by a predetermined value.

According to the present disclosure, by realizing open-loop power control through sidelink control channel (PSCCH) transmit power ramping during 5G NR sidelink communication, problems such as resource consumption and terminal power consumption increase and interference on uplink reception can be resolved, and reliable sidelink communication can be secured.

BRIEF DESCRIPTION OF DRAWINGS

FIGS. 10A and 10B are exemplary diagrams for describing transmit power ramping when a transmitting terminal transmits sidelink control channels according to an exemplary embodiment of the present disclosure.

FIGS. 13A and 13B are exemplary diagrams for describing transmit power ramping when a transmitting terminal transmits sidelink control channels according to an exemplary embodiment of the present disclosure.

FIG. 14 is an exemplary diagram for describing a case in which one transmitting terminal and three receiving terminals exist in a groupcast communication mode according to an exemplary embodiment of the present disclosure.

FIG. 15 is an exemplary diagram for describing a case in which one transmitting terminal and three receiving terminals exist in a groupcast communication mode according to another exemplary embodiment of the present disclosure.

DETAILED DESCRIPTION OF THE EMBODIMENTS

Figure 1:
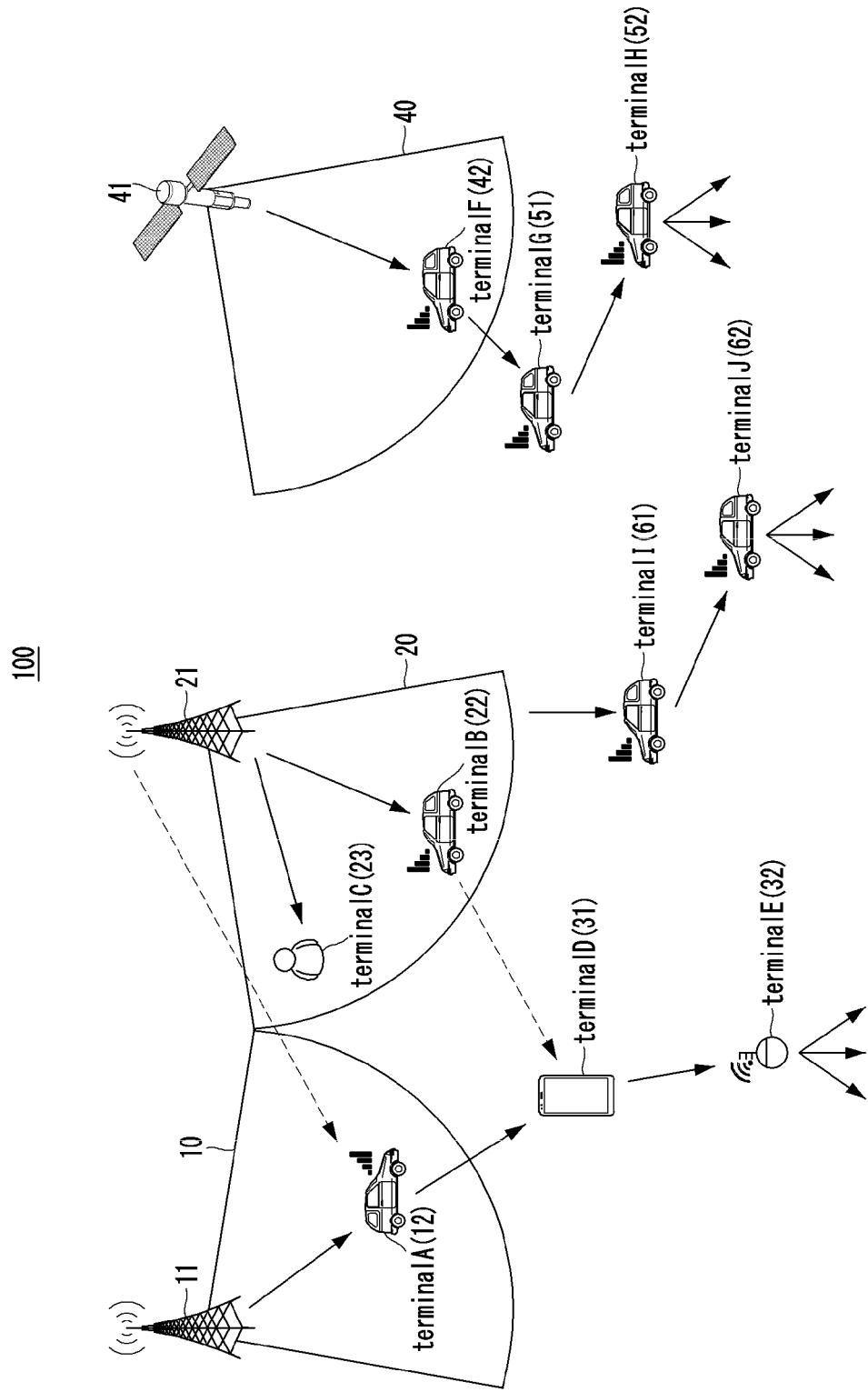
FIG. 1 is an exemplary diagram for describing a 5G NR-based sidelink service scenario.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, 'at least one of A and B' may mean 'at least one of A or B' or 'at least one of combinations of one or more of A and B'. Also, in exemplary embodiments of the present disclosure, 'one or more of A and B' may mean 'one or more of A or B' or 'one or more of combinations of one or more of A and B'.

In exemplary embodiments of the present disclosure, '(re)transmission' may mean 'transmission', 'retransmission', or 'transmission and retransmission', '(re)configuration' may mean 'configuration', 'reconfiguration', or 'configuration and reconfiguration', '(re)connection' may mean 'connection', 'reconnection', or 'connection and reconnection', and '(re-)access' may mean 'access', 're-access', or 'access and re-access'.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

In 2016, the International Telecommunication Union-Radiocommunication sector (hereafter 'ITU-R') announced the vision and requirements for the fifth generation mobile communication, and unlike the fourth generation mobile communication, requested the development of standards actually providing various services through three core services. The three core services comprise enhanced Mobile BroadBand (eMBB, hereinafter eMBB) that provides high-speed data, Ultra-Reliable and Low-Latency Communication (URLLC), and massive Internet-of-Things services (hereafter referred to as mMTC), and requirements are individually defined for each service. The reason ITU-R specified three core services as described above was to prepare for the convergence of numerous other industries and mobile communications in the 5G mobile communication era, and this was to be prepared in advance in the standard specifications.

In order to realize this, the 3GPP provided the basis for providing various services in the mobile communication network by enabling software-defined networking/network function virtualization (SDN/NFV)-based network slicing to be realized in the core network specifications. In addition, in order to realize the requirements such as low-latency, a mobile edge computing (MEC) structure in which the core network is located adjacently to RAN base stations has been reflected.

Meanwhile, in order to support services required in various industrial fields, attempts are being made to utilize the 5G mobile communication as an infrastructure that provides new convergence services based on the three core services. However, these attempts remain at the level of a demonstration project, and have not yet led to concrete large-scale results. The causes are due to competition for the initiative of players in each industry for convergence services, lack of technological perfection in the early stage of 5G commercialization, and security concerns in other industries about data generated from the convergence services.

A typical convergence service with other industries is a vehicle-related convergence service. To this end, the 3GPP, an international standards organization for mobile communication, first introduced Device-to-Device (D2D) communication for proximity services using cellular technology in the release-12 specifications. In addition, by using this technology, LTE (cellular)-based vehicle communication (cellular vehicle-to-everything, C-V2X) technology was adopted in the release-14. Subsequently, the 3GPP developed 5G NR-based cellular-based vehicle communication technology in the release-16 through the release-15.

The concept of sidelink was introduced in the 5G NR-based C-V2X (release-16), which is a link configured to perform direct communication between terminals (vehicles) without going through a network. The technology has been developed so that it can be used for various convergence services that require direct communication between terminals. Hereinafter, as a prior art, characteristics of a sidelink physical layer among 5G NR V2X technologies will be briefly described.

FIG. 1 is an exemplary diagram for describing a 5G NR-based sidelink service scenario.

Referring to FIG. 1, a first base station 11 forms a first coverage 10 to provide services, and a second base station 21 forms a second coverage 20 to provide services. The first base station 11 provides services to a terminal A 12 within the first coverage 10, and the second base station 21 provides services to a terminal B 22 and a terminal C 23 within the second coverage 20. The terminal 12 is synchronized with the first base station 11, and the terminal 22 and the terminal 23 are synchronized with the second base station 21 (Level 2).

Meanwhile, since a terminal D 31 is outside the first coverage 10 and the second coverage 20, it cannot be synchronized with the first base station 11 or the second base station 21. As shown in FIG. 1, the terminal D 31 may configure the terminal 12 as a reference synchronization (i.e., SyncRef) terminal, and may be synchronized with the terminal 12 by using a sidelink synchronization signal block (S-SSB) transmitted by the terminal 12 (Level 3). Meanwhile, since a terminal E 32 cannot be synchronized with a terminal located within the first coverage 10 or the second coverage 20 and synchronized with the first base station 11 or the second base station 12, the terminal 32 may be synchronized with a terminal (e.g., terminal 31) that has configured the terminal 12 or terminal 22 as a reference synchronization terminal, which is out of coverage (Level 7).

On the other hand, although a terminal F 42 is outside the first coverage 10 and the second coverage 20, the terminal 42 can acquire synchronization within a third coverage 40 of a GNSS network 41 that provides absolute time synchronization (Level 5). In addition, a terminal G 51 connected to the terminal 42 but out of the third coverage 40 may configure the terminal 42 as a SyncRef terminal, and may be synchronized with the terminal 42 by using an S-SSB transmitted by the terminal 42 (Level 6).

The terminal 51 uses the terminal 42 synchronized with the GNSS network, rather than the terminal (e.g., terminal 12) synchronized with the first base station 11, as a reference synchronization terminal (Level 6). A terminal H 52 uses the terminal 51 as a reference synchronization terminal. The terminal 52 has the same priority as the terminal 32 because they are located out of the first coverage 10, second coverage 20, and GNSS coverage 40, and synchronized with a terminal located and synchronized within the first coverage 10, second coverage 20, and GNSS coverage 40 (Level 7).

On the other hand, if a terminal does not belong to any coverage and there is no reference synchronization terminal, it may be necessary to use the terminal's own clock as a reference for synchronization, and a terminal I 61 may correspond to this case. This case is a method that can be used when all of the above conditions are not satisfied, and is actually used with the lowest priority (Level 8). However, a terminal J 62 may use the terminal 61, which uses its own clock as a synchronization reference, as a reference synchronization terminal, may have the same priority as the terminal 32 and the terminal 52 (Level 7).

According to the 5G sidelink service scenario exemplary embodiment illustrated in FIG. 1, it can be seen that direct communication between terminals can be provided by utilizing sidelinks for various situations in the 5G communication. However, for this purpose, terminals performing direct communication should secure and maintain synchronization between the terminals regardless of which synchronization signal is used. Hereinafter, based on this, channels required for direct communication between terminals using 5G sidelinks, in particular, physical layer (hereinafter PHY) channels, will be described.

The PHY channels used for the 5G sidelink may include a Physical Sidelink Shared Channel (PSSCH) that substantially carries user data, signaling, and a part of (i.e. second-stage) control signal (i.e., sidelink control information (SCI)), a Physical Sidelink Control Channel (PSCCH) for carrying a part of (i.e., first-stage) the SCI required for receiving an associated PSSCH, a Physical Sidelink Broadcast Channel (PSBCH) that a reference synchronization terminal transmits to target terminals through an S-SSB, a Physical Sidelink Feedback Channel (PSFCH) for carrying a Hybrid Automatic Repeat Request (HARQ) feedback signal providing high reliability of PSSCH transmission, and the like.

In addition, reference signals used for the 5G sidelink may include a Demodulation Reference Signal (DM-RS) for demodulation of the PSSCH, PSCCH, and PSBCH, a Phase Tracking Reference Signal (PT-RS) transmitted to remove frequency errors and noises generated in a high-frequency channel, a channel state information reference signal (CSI-RS) used for channel measurement for channel state information, and the like. In addition, a Sidelink Primary Synchronization Signal (SPS) and a Sidelink Secondary Synchronization Signal (SSSS) may be included in the synchronization signal of the S-SSB.

Hereinafter, slot formats for transmitting the PHY channels, reference signals, and synchronization signals used in the 5G sidelink will be briefly described.

Figure 2:
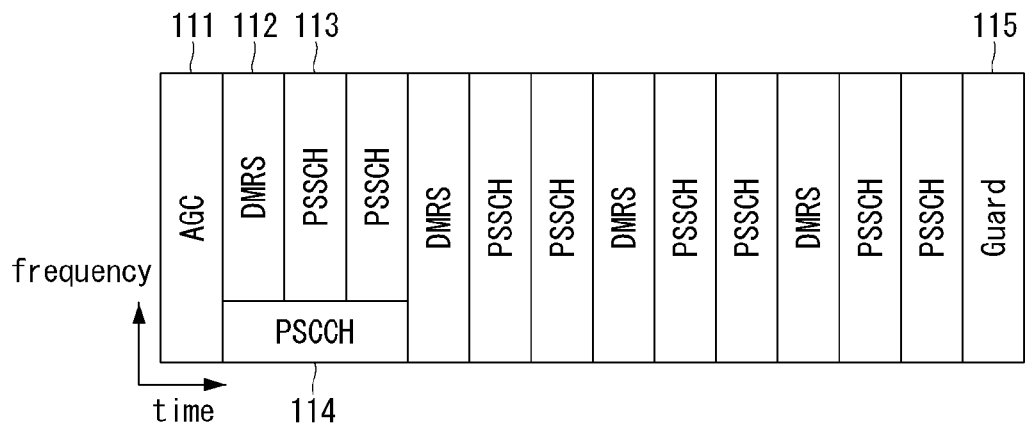
FIG. 2 is an exemplary diagram of a 5G NR-based sidelink slot format according to a first exemplary embodiment.

FIG. 2 is an exemplary diagram of a 5G NR-based sidelink slot format according to a first exemplary embodiment.

Referring to FIG. 2, in a first exemplary embodiment of the 5G NR-based sidelink slot format, a slot format using a normal cyclic prefix (CP), which is composed of fourteen symbols within one slot, is exemplified.

Looking specifically at the first exemplary embodiment of the sidelink slot format, the first OFDM symbol period may be an automatic gain control (AGC) period 111. The OFDM symbol of the AGC period 111 may be configured by copying a signal transmitted in the second OFDM symbol period in order to stabilize an AGC operation in a receiving side. In addition, the last OFDM symbol period is configured as a guard period 115 in which transmission and reception can be switched. In addition, in twelve symbol periods from the second OFDM symbol period to the thirteenth OFDM symbol period, a DMRS 112 for demodulation may be arranged in every three OFDM symbol periods. In the twelve symbol periods, a PSSCH 113 that substantially carries user data, signaling, and a part of (i.e. second-stage) of sidelink control information (SCI) may be arranged in the remaining two OFDM symbol periods in which the DMRS is not disposed among the three OFDM symbols. Here, a PSCCH 114 that carries a part of (first-stage) of SCI necessary to receive the PSSCH may be transmitted through a part of the second OFDM symbol period to the fourth OFDM symbol period, that is, a part of the three OFDM symbol periods.

In FIG. 2, since the DMRS arranged in every three OFDM symbol periods is transmitted in the second OFDM symbol period among the every there OFDM symbol periods, the DMRS may be transmitted in the fifth OFDM symbol period, eighth OFDM symbol period, and eleventh OFDM symbol period among the fourteen OFDM symbol periods. Therefore, the PSSCH 113 may be transmitted the third OFDM symbol period, fourth OFDM symbol period, sixth OFDM symbol period, seventh OFDM symbol period, ninth OFDM symbol period, tenth OFDM symbol period, twelfth OFDM symbol period, and thirteenth OFDM symbol period.

Figure 3:
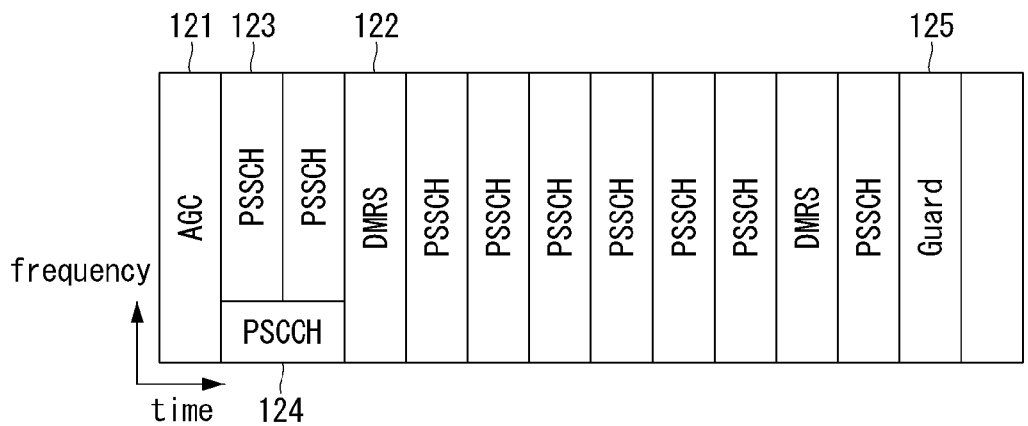
FIG. 3 is an exemplary diagram of a 5G NR-based sidelink slot format according to a second exemplary embodiment.

FIG. 3 is an exemplary diagram of a 5G NR-based sidelink slot format according to a second exemplary embodiment.

Referring to FIG. 3, in a second exemplary embodiment of the 5G NR-based sidelink slot format, similarly to the first exemplary embodiment described above, a slot format using a normal CP, which is composed of fourteen symbols within one slot, is exemplified.

Looking specifically at the second exemplary embodiment of the sidelink slot format, the first OFDM symbol period may be an AGC period 121. The OFDM symbol of the AGC period 121 may be configured by copying a signal transmitted in the second OFDM symbol period in order to stabilize an AGC operation in a receiving side. In addition, the second OFDM symbol period from the last OFDM symbol period is configured as a guard period 125 in which transmission and reception can be switched. In addition, in the eleven symbol periods from the second OFDM symbol period to the twelfth OFDM symbol period, a PSSCH 123 that substantially carries user data, signaling, and a part of (i.e., second-stage) SCI and a DMRS 122 for demodulation may be arranged. The DMRS may be transmitted in the fourth OFDM symbol period and the eleventh OFDM symbol period. The PSSCH may be transmitted in the remaining OFDM symbol periods in which the DMRS is not transmitted among the eleven symbol periods from the second OFDM symbol period to the twelfth OFDM symbol period. In addition, a PSCCH 124 that carries a part of (i.e., first-stage) SCI necessary to receive the PSSCH may be transmitted through a part of the second OFDM symbol period and the third OFDM symbol period.

Figure 4:
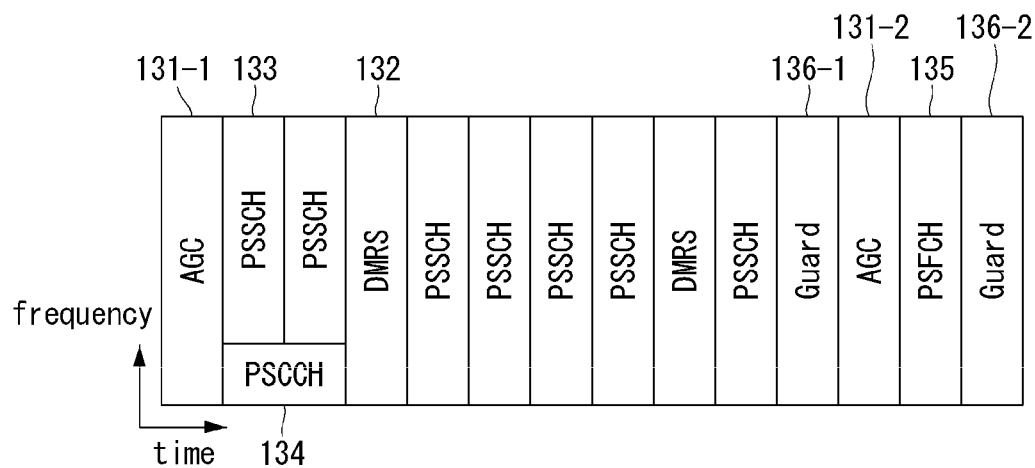
FIG. 4 is an exemplary diagram of a 5G NR-based sidelink slot format according to a third exemplary embodiment.

FIG. 4 is an exemplary diagram of a 5G NR-based sidelink slot format according to a third exemplary embodiment.

Referring to FIG. 4, in a third exemplary embodiment of the 5G NR-based sidelink slot format, similarly to the first and second exemplary embodiments described above, a slot format using a normal CP, which is composed of fourteen symbols within one slot, is exemplified. In FIG. 4, a slot format including a PSFCH, different from the previous exemplary embodiments, is illustrated.

Looking specifically at the third exemplary embodiment of the sidelink slot format, the first OFDM symbol period may be a first AGC period 131-1. The first AGC period 131-1 may be configured by copying a signal transmitted in the second OFDM symbol period in order to stabilize an AGC operation in a receiving side. Here, the first AGC period 131-1 may be an AGC period for PSSCH transmission. In addition, the eleventh OFDM symbol period and the fourteenth OFDM symbol period may be respectively configured as guard periods 136-1 and 136-2 in which transmission and reception can be switched. In addition, in the nine OFDM symbol periods from the second OFDM symbol period to the tenth OFDM symbol period, a PSSCH 133 that substantially carriers user data, signaling, and a part of (i.e. second-stage) SCI and a DMRS 132 for demodulation may be arranged. The DMRS may be transmitted in the fourth OFDM symbol period and the ninth OFDM symbol period. The PSSCH may be transmitted in the remaining OFDM symbol periods in which the DMRS is not transmitted among the second OFDM symbol period to the tenth OFDM symbol period. In addition, a PSCCH 134 that carries a part of (i.e., first-stage) SCI necessary for receiving the PSSCH may be transmitted through a part of the second OFDM symbol period and the third OFDM symbol period.

Meanwhile, the sidelink slot format according to the third exemplary embodiment illustrated in FIG. 4 may be used for a slot for receiving a demodulation result from a receiving terminal receiving a PSSCH. Accordingly, the first guard period 136-1 may be a period for switching between transmission and reception. In addition, it may include a second AGC period 131-2 for AGC, a PSFCH 135, and the second guard period 136-2. The OFDM symbol transmitted in the second AGC period 131-2 may be transmitted by copying a PSFCH symbol in order to stabilize an AGC operation at the receiving side. In addition, the PSFCH 135 may be configured to include feedback information for carrying the demodulation result of the PSSCH from the receiving terminal to the transmitting terminal. The last OFDM symbol period may be configured as the second guard period 136-2 for the next operation after completing one sidelink slot format.

Figure 5:
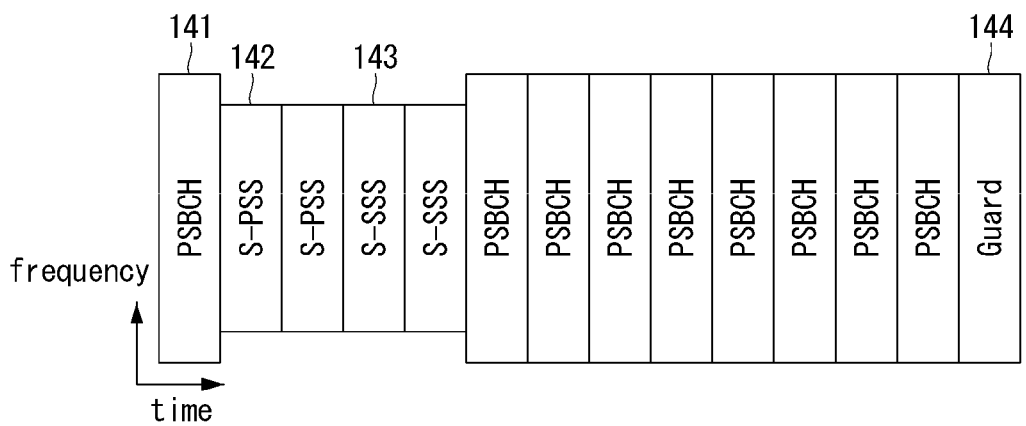
FIG. 5 is an exemplary diagram of a 5G NR-based sidelink slot format according to a fourth exemplary embodiment.

FIG. 5 is an exemplary diagram of a 5G NR-based sidelink slot format according to a fourth exemplary embodiment.

Referring to FIG. 5, in a fourth exemplary embodiment of the 5G NR-based sidelink slot format, similarly to the first to third exemplary embodiments described above, a slot format using a normal CP, which is composed of fourteen symbols within one slot, is exemplified. However, differently from the previous exemplary embodiments, FIG. 5 illustrates a format for transmitting S-PSS and S-SSS for synchronization in the 5G sidelink.

Looking specifically at the fourth exemplary embodiment of the sidelink slot format, a PSBCH 141 that carriers a message including system parameters for sidelink may be transmitted in the first OFDM symbol period. In addition, an S-PSS 142 may be transmitted in the second and third OFDM symbol periods. Here, the S-PSS 142 may be configured using one of two types of S-PSS sequences, and may be configured to be transmitted using 127 subcarriers. An S-SSS 143 may be transmitted in the fourth and fifth OFDM symbol periods. Here, the S-SSS 143 may be configured using one of 336 types of S-SSS sequences, and may be configured to be transmitted using 127 subcarriers. A PSBCH may be transmitted in the sixth to thirteenth OFDM symbol periods, and the last fourteenth OFDM symbol period may be a guard period 144 for the next operation after completing one sidelink slot format.

Figure 6:
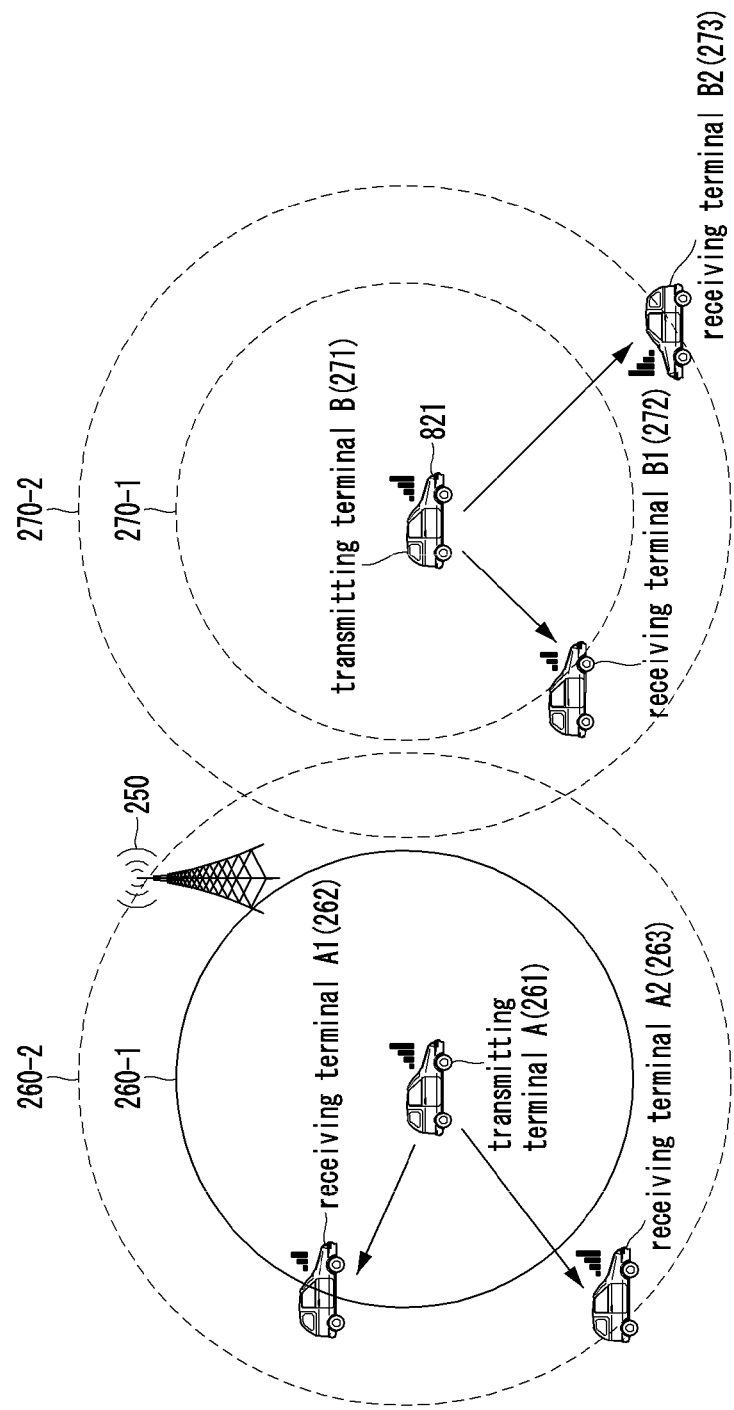
FIG. 6 is an exemplary diagram for describing each case of transmitting terminals and receiving terminals in sidelink transmission according to the present disclosure.

FIG. 6 is an exemplary diagram for describing each case of transmitting terminals and receiving terminals in sidelink transmission according to the present disclosure.

In FIG. 6, two different transmitting terminals 261 and 271 are exemplified. The transmitting terminal A 261 may be a terminal adjacent to a base station 250, and the transmitting terminal B 271 may be a terminal far away from the base station 250. In addition, each of the transmitting terminals 261 and 271 may be terminals located within a coverage of the base station 250.

The transmitting terminal 261 may be a terminal transmitting a signal based on at least one of unicast, groupcast, and broadcast schemes. Similarly, the transmitting terminal 271 may be a terminal transmitting a signal based on at least one of unicast, groupcast, and broadcast schemes.

The transmitting terminal 261 may transmit a signal to a receiving terminal A1 262 and/or a receiving terminal A2 263. The transmitting terminal 261 may communicate by forming a sidelink coverage 260-1 for communicating with the receiving terminal 262. In addition, the transmitting terminal 261 may communicate by forming a sidelink coverage 260-2 for communicating with the receiving terminal 263.

In the same manner, the transmitting terminal 271 may transmit a signal to a receiving terminal B1 222 and/or a receiving terminal B2 273. The transmitting terminal 271 may communicate by forming a sidelink coverage 270-1 for communicating with the receiving terminal 272. In addition, the transmitting terminal 261 may communicate by forming a sidelink coverage 270-2 for communicating with the receiving terminal 273.

Meanwhile, in a sidelink providing direct communication between terminals, an open-loop scheme has been adopted as a power control scheme. The sidelink power control may be applied to transmission of the sidelink channels, that is, PSCCH, PSSCH, PSFCH and S-SSB. In addition, the sidelink power control may be applied to unicast transmission and groupcast transmission among sidelink communications, and may not be applied to broadcast transmission.

In sidelink unicast transmission, PSSCH power control may be largely configured in three modes.
1) Mode considering only a downlink path loss (i.e., path loss between a base station and a terminal, $PL_{DL}$)
2) Mode considering only a sidelink path loss (i.e., path loss between a transmitting terminal and a receiving terminal, $PL_{SL}$)
3) Mode considering both a downlink path loss and a sidelink path loss The first mode (mode considering only a downlink path loss) may be a mode applicable when a terminal is within a network coverage, and may serve to reduce an influence of interference on uplink reception at the base station due to sidelink transmission. That is, through the first mode, a transmitting terminal (i.e., a terminal with a small downlink path loss) close to the base station may transmit with a less power than a transmitting terminal (i.e., a terminal with a large downlink path loss) far from the base station.

For example, as shown in FIG. 6, it is assumed that the transmitting terminal 261 operates in the first PSSCH power control mode while being close to the coverage of the base station 250. In this case, since the transmitting terminal 261 forms the sidelink coverage 260-1 in consideration of the downlink path loss, communication with the receiving terminal 262 may be successful. However, there may be a phenomenon in which communication with the receiving terminal 263 is not successful due to the transmit power determined based on the downlink path loss.

On the other hand, assuming that the transmitting terminal 271 exists far within the coverage of the base station 250 and operates in the first mode, since the transmitting terminal 271 forms the sidelink coverage 270-2 by considering a downlink path loss, communication with both the receiving terminal 272 and the receiving terminal 273 may be successful. However, the sidelink coverage 270-2 may be much larger than the sidelink coverage 270-1 formed by a transmit power required by the receiving terminal 272.

Therefore, when the first mode power control mode is used, there is an advantage of maintaining the interference effect on uplink reception in the terminal close to the base station, but a problem may occur in communication with the receiving terminals outside the limited sidelink coverage. Conversely, when the first mode power control mode is used, the terminal far away from the base station may have a problem of causing an increase in power consumption of the terminal due to unnecessarily excessive transmit power.

Next, the second mode (mode considering only a sidelink path loss) will be described. The second mode may be a mode applicable both when a terminal is within a network coverage or when a terminal is out of a network coverage. That is, it is a method of forming a sidelink coverage in consideration of only a sidelink path loss. In the second mode, since a transmit power is determined based on a path loss with a terminal to communicate, a case where communication is difficult may not occur because a transmit power required for sidelink communication is used, but a problem of excessive interference on uplink reception at the base station due to a transmitting terminal close to the base station may occur.

For example, as shown in FIG. 6, if the transmitting terminal 261 located close to the base station 250 operates in the second mode, when communicating with the receiving terminal 262 and communicating with the receiving terminal 263, the transmitting terminal 261 may determine a required transmit power by considering each sidelink path loss. Therefore, the sidelink coverage 260-1 required when the transmitting terminal 261 communicates with the receiving terminal 262 and the sidelink coverage 260-2 required when the transmitting terminal 261 communicates with the receiving terminal 263 may be formed. Accordingly, the transmitting terminal 261 may use a greater transmit power when communicating with the receiving terminal 263 than when communicating with the receiving terminal 262. When the transmitting terminal 261 communicates with the receiving terminal 263, a greater interference may be exerted on uplink reception at the base station 250.

On the other hand, assuming that the transmitting terminal 271 is within the coverage of the base station 250 and operates in the second mode while being far from the base station 250, when communicating with the receiving terminal 272 and communicating with the receiving terminal 273, a required transmit power may be determined by considering each sidelink path loss. The sidelink coverage 270-2 when the transmitting terminal 271 communicates with the receiving terminal 273 may be wider than the sidelink coverage 270-1 when the transmitting terminal 271 communicates with the receiving terminal 272. As such, when the transmitting terminal 271, which is far from the base station, uses the power control scheme of the second mode, the influence of interference on the uplink reception at the base station 250 may be reduced, and the sidelink communication can be smoothly provided.

As described above, the first mode and the second mode of power control used for sidelink unicast transmission have advantages and disadvantages depending on the location of the transmitting terminal. Therefore, it may be preferable to use the third mode utilizing both a downlink path loss and a sidelink path loss. That is, according to the location and path losses of the terminal, the sidelink power control mode may be configured as the mode using both the downlink path loss and the sidelink path loss, and the best performance will be obtained by considering the location between the terminals and finding an optimal method.

Meanwhile, in sidelink groupcast transmission of the 5G NR, the PSSCH power control uses only the mode that considers only a downlink path loss. The open-loop power control operation for groupcast operates in the same manner as in the first mode in unicast transmission. In the 5G NR, the PSCCH, PSSCH, and PSFCH are used for sidelink transmission.

Figure 7:
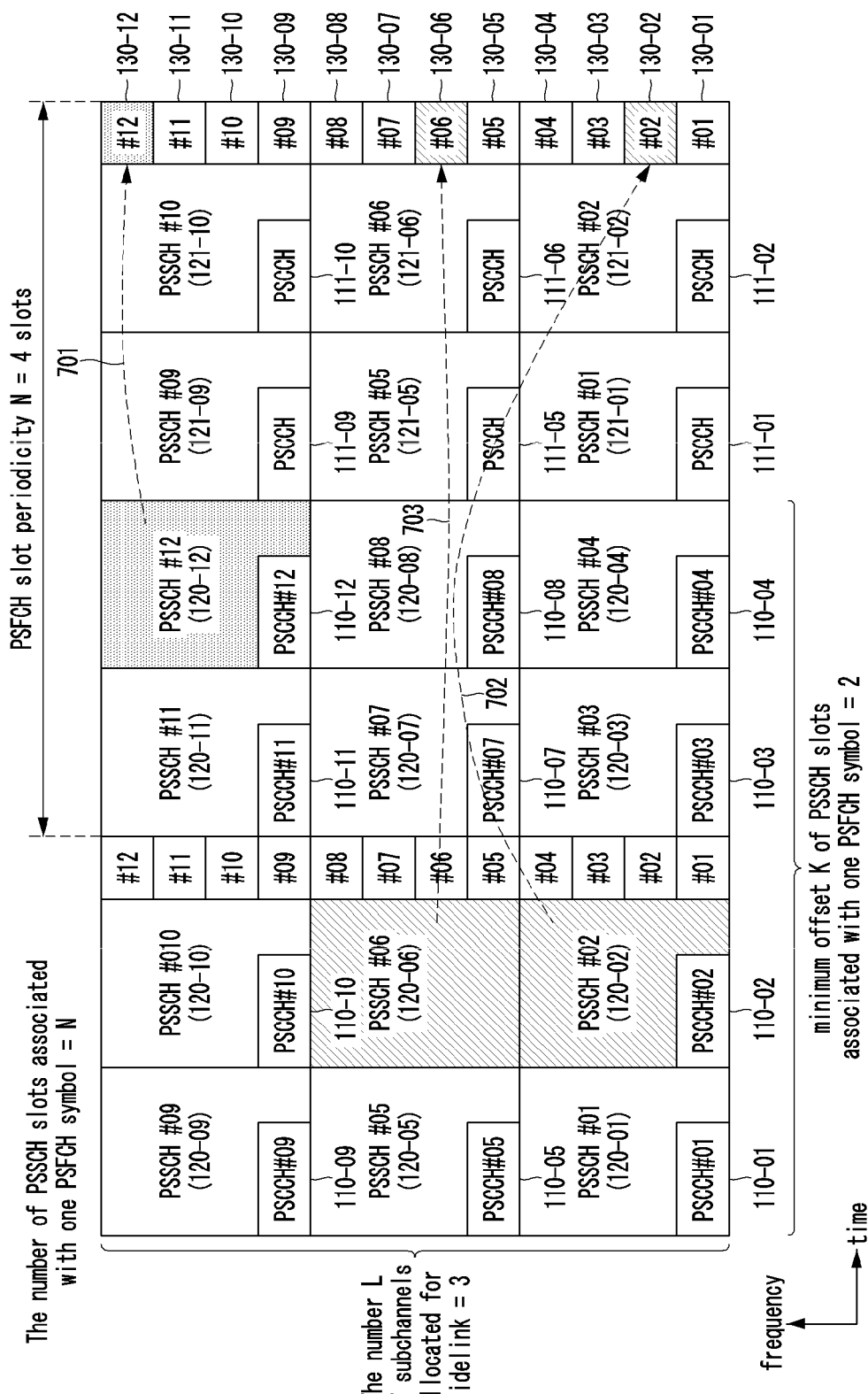
FIG. 7 is a diagram illustrating an exemplary embodiment of a sidelink channel transmission scenario of the 5G NR.

FIG. 7 is a diagram illustrating an exemplary embodiment of a sidelink channel transmission scenario of the 5G NR.

Referring to FIG. 7, an example in which PSSCHs carrying sidelink data are transmitted through different subchannels and PSFCHs for HARQ feedbacks are transmitted is illustrated. In addition, PSSCHs for carrying a part of (i.e., first-stage) SCI necessary to receive the PSSCHs are exemplified together.

FIG. 7 illustrates an exemplary embodiment of 5G NR sidelink channel transmission scenario, in which the number N of PSSCH slots associated with one PSFCH symbol is four, the number L of subchannels allocated to a sidelink is three, a PSFCH periodicity N is four slots, and a minimum offset K of PSSCH slots associated with one PSFCH symbol is two.

More specifically, the first subchannel will be described. A PSSCH #01 120-01 and a PSSCH #02 120-02 may be sequentially transmitted through the first subchannel, and a PSFCH symbol associated with PSSCHs transmitted in previous slots may be transmitted. In addition, a PSSCH #03 120-03, a PSSCH #04 120-04, a PSSCH #01 121-01, and a PSSCH #02 121-02 may be transmitted through the first subchannel. In addition, a PSFCH symbol associated with the PSSCH 120-01, PSSCH 120-02, PSSCH 120-03, and PSSCH 120-04 may transmitted through the first subchannel. PSCCHs 110-01, 110-02, 110-03, 110-04, 111-01, and 111-02 respectively corresponding to the PSSCHs 120-01, 120-02, 120-03, 120-04, 121-01, and 121-02 transmitted through the first subchannel may be transmitted using some symbols in the corresponding slots.

Looking at transmission through the second subchannel, a PSSCH #05 120-05 and a PSSCH #06 120-06 may be sequentially transmitted through the second subchannel, and a PSFCH symbol associated with PSSCHs transmitted in previous slots may be transmitted. In addition, a PSSCH #07 120-07, PSSCH #08 120-08, a PSSCH #05 121-05, and a PSSCH #6 121-06 may be transmitted through the second subchannel. In addition, a PSFCH symbol associated with the PSSCH 120-05, PSSCH 120-06, PSSCH 120-07, and PSSCH 120-08 may be transmitted through the second subchannel. PSCCHs 110-05, 110-07, 110-008, 111-05, and 111-06 respectively corresponding to the PSSCHs 120-05, 120-07, 120-08, 121-05, and 121-06 transmitted through the second subchannel may be transmitted using some symbols in the corresponding slots.

The PSSCH 120-06 of the second subchannel may have a form that does not have a corresponding PSCCH. SCI associated with the PSSCH 120-06 may be transmitted on the
PSCCH 110-02 corresponding to the PSSCH 120-02.

Looking at the third subchannel, a PSSCH #09 120-09 and a PSSCH #10 120-10 may be sequentially transmitted through the third subchannel, and then a PSFCH symbol associated with PSSCHs transmitted in previous slots may be transmitted. In addition, a PSSCH #11 120-11, a PSSCH #12 120-12, a PSSCH #09 121-09, and a PSSCH #10 121-10 may be transmitted through the third subchannel. In addition, a PSFCH symbol associated with the PSSCH 120-09, PSSCH 120-10, PSSCH 120-11, and PSSCH 120-12 may be transmitted through the third subchannel. PSCCHs 110-09, 110-10, 110-11, 110-12, 111-09, and 111-10 respectively corresponding to the PSSCHs 120-09, 120-10, 120-11, 120-12, 121-09, and 121-10 transmitted through the third subchannel may be transmitted using some symbols in the corresponding slots, similarly to the case of the first subchannel.

Finally, the PSFCH symbol shown last in each subchannel may transmit HARQ feedback signals for providing high reliability to the PSSCHs transmitted through each subchannel.

As described above, since the PSFCH periodicity is four slots, HARQ feedback signals for PSSCHs of four slots transmitted in the corresponding subchannel may be transmitted in a PSFCH period.

To summarize the above, one PSCCH and one PSSCH may be basically transmitted per PSSCH slot and subchannel, and there is a feedback symbol period for transmitting PSSCH reception result(s) at every PSFCH period.

However, a case in which a PSCCH does not exist in every slot will be described. As illustrated in FIG. 7, the PSSCH 120-06 is located in a slot in which a corresponding PSCCH is not transmitted. SCI corresponding to the PSSCH 120-06 may be transmitted on the PSCCH 110-02 located in the same slot and the same subchannel as the PSSCH 120-02.

Next, the HARQ feedback will be described. The HARQ feedbacks may be allocated to PSFCHs 130-01 to 130-12 corresponding to associated slots in the corresponding subchannel. For example, a feedback for reception results of the PSCCH 110-12 and PSSCH 120-12 may be transmitted on the PSFCH 130-12 as indicated by a reference numeral 701. For each of the PSSCH 120-2 and the PSSCH 120-6 associated with one PSCCH 110-2, a feedback may be transmitted through a PSFCH corresponding to each slot in the corresponding subchannel. More specifically, a feedback for a reception result of the PSSCH 120-02 may be transmitted on the PSFCH 130-02 as indicated by a reference numeral 702, and a feedback of a reception result of the PSSCH 120-06 may be transmitted on the PSFCH 130-6 as indicated by a reference numeral 703. As such, each of the PSFCHs 130-01 to 130-12 may feedback reception states of PSSCH(s) and/or PSCCH(s) transmitted through one slot in the corresponding subchannel.

According to the configuration of FIG. 7 described above, one PSCCH and one PSSCH are basically transmitted for every PSSCH slot and subchannel, and in a specific case, one PSCCH may carry SCIs for two or more PSSCHs. In addition, PSFCH resources corresponding to every PSSCH slot and subchannel may be allocated.

Figure 8:
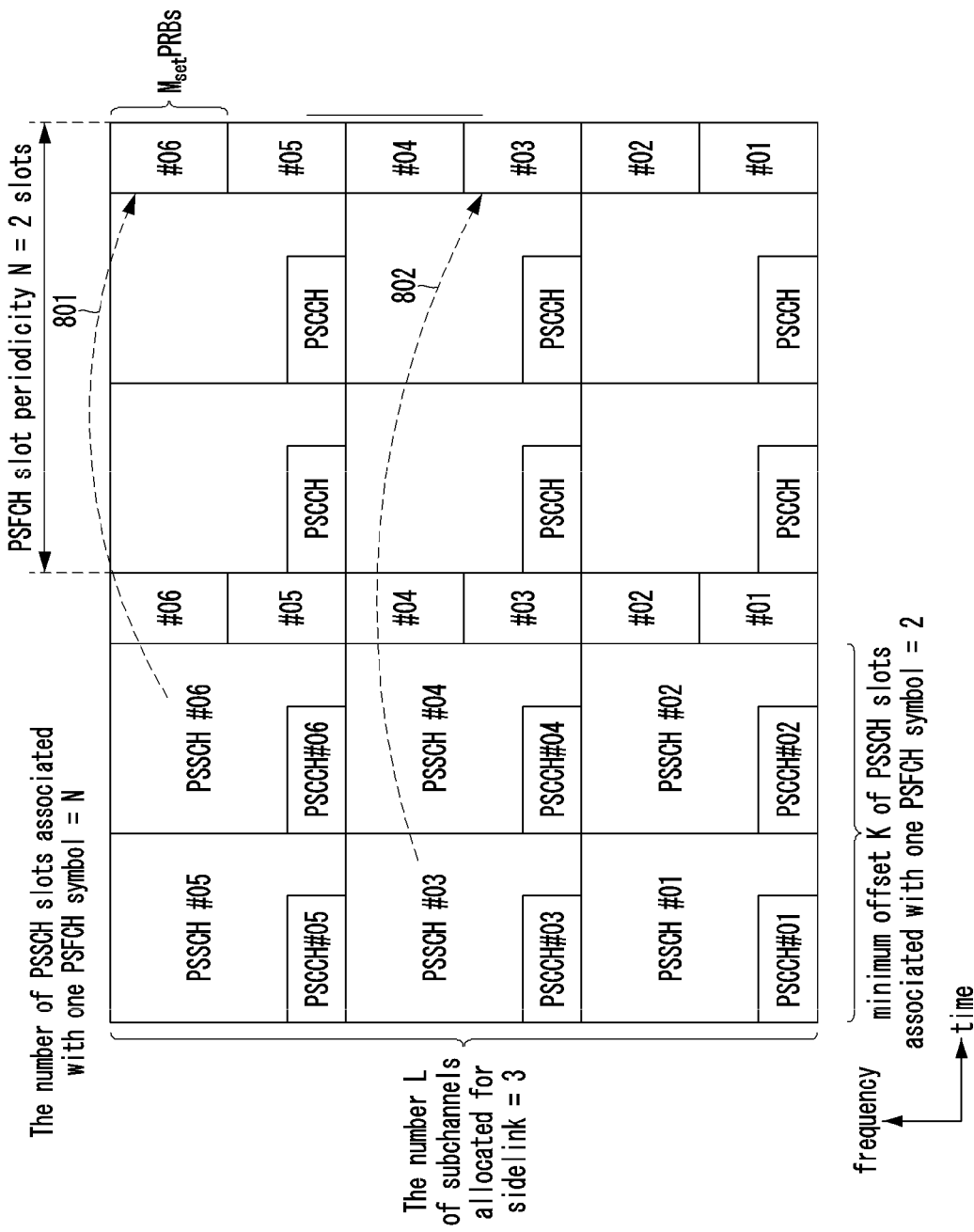
FIG. 8 is a diagram illustrating another exemplary embodiment of a sidelink channel transmission scenario of the 5G NR.

FIG. 8 is a diagram illustrating another exemplary embodiment of a sidelink channel transmission scenario of the 5G NR.

Referring to FIG. 8, similarly to that described in FIG. 7, an example in which PSSCHs carrying sidelink data are transmitted through different subchannels, and PSFCHs for HARQ feedbacks are transmitted is illustrated. In addition, PSSCHs carrying a part of (i.e., first-stage) SCI necessary to receive the PSSCHs are exemplified together.

In the exemplary embodiment of FIG. 8, in consideration of a time required for PSSCH demodulation, an interval between a PSCCH/PSSCH and a corresponding PSFCH may be a minimum of two slots, and may be a maximum of three slots. Specifically, for example, a HARQ feedback associated with a PSSCH #06 and a PSCCH #06 may be transmitted on a PSFCH #06 as indicated by a reference numeral 801. In this case, the interval between the PSCCH/PSSCH and the PSFCH may be two slots. As another example, a HARQ feedback associated with a PSSCH #03 and a PSCCH #03 may be transmitted on a PSFCH #03 as indicated by a reference numeral 802. In this case, the interval between the PSCCH/PSSCH and the PSFCH may be three slots.

If the PSFCH periodicity is shortened as illustrated in FIG. 8, the effect of reducing the latency for sidelink communication can be achieved, which can be more effectively utilized for low-latency services such as V2X.

Since the detailed configuration of FIG. 8 can be understood using the contents described with reference to FIG. 7, a detailed additional description will be omitted.

Meanwhile, a HARQ feedback for transmitting reception results of PSCCH and PSSCH in sidelink transmission may be configured differently depending on a communication mode. Hereinafter, the sidelink HARQ feedback defined in the 5G NR specifications will be briefly described.

First, in the unicast communication mode, a receiving terminal may perform one of the following three operations.
1) When the receiving terminal successfully receives a PSCCH and successfully receives a PSSCH including user data and additional control information by using control information of the PSCCH, the receiving terminal may transmit ACK to the transmitting terminal.
2) When the receiving terminal successfully receives a PSCCH, but does not successfully receive a PSSCH including user data and additional control information, the receiving terminal may transmit NACK to the transmitting terminal.
3) When the receiving terminal does not successfully receive a PSCCH, the receiving terminal does not transmit any signal to the transmitting terminal ('No Signal').

The three cases described above may be interpreted as indicating a state of a received power level as follows.

For example, when the receiving terminal transmits ACK on a PSFCH, it may mean that a sidelink transmit power currently set between the receiving terminal and the transmitting terminal is sufficient to receive the PSCCH and the PSSCH.

As another example, when the receiving terminal transmits NACK on a PSFCH, it may mean that a sidelink transmit power currently set between the receiving terminal and the transmitting terminal is sufficient to receive the PSCCH, but is somewhat insufficient to receive the PSSCH.

As yet another example, when the receiving terminal does not transmit any signal on a PSFCH, it may mean that a sidelink transmit power currently set between the receiving terminal and the transmitting terminal is insufficient to receive the PSCCH and the PSSCH.

Meanwhile, in the 5G NR specifications, two options have been adopted as a sidelink HARQ feedback scheme in the groupcast communication mode.

In the first option, as a NACK-based feedback scheme, only when a receiving terminal successfully receives a PSCCH but does not successfully receive a PSSCH, and a relative distance between the receiving terminal and a transmitting terminal is within a required communication range, the receiving terminal transmits NACK to the transmitting terminal. In other cases, the receiving terminal does not transmit a signal ('No Signal').

In the second option, the same procedure as the sidelink HARQ feedback procedure in the unicast communication mode is used.

In the first option, since a PSFCH channel is shared and used by terminals belonging to the corresponding groupcast group, there is an advantage in that the PSFCH resource efficiency is increased, but there is a disadvantage that the reliability of the sidelink groupcast communication may be somewhat insufficient.

In the second option, the PSFCH resource efficiency is lowered because PSFCH channel resources are separately allocated to terminals belonging to the groupcast group, but there is an advantage in that the reliability of sidelink groupcast communication can be increased through retransmission to a specific terminal.

As described above, in the 5G NR sidelink communication, in order to provide direct communication between terminals, synchronization between the terminals, open-loop power control between the terminals, and HARQ operations between the terminals are performed, and thus reliability may be relatively lowered compared to communication between a base station and a terminal. Typically, when sidelink communication is performed based on open-loop power control, an error may occur in measuring a downlink path loss and a sidelink path loss for the open-loop power control. This error may cause excessive transmit power. The excessive transmit power may cause a problem that greatly affects uplink call quality. In order to solve this problem, a sufficient negative power offset may be applied to the transmit power estimated by the open-loop power control, so that a transmit power smaller than the estimated transmit power is used for transmission.

For example, even in a random access method using open-loop power control, in order to prevent such the excessive transmit power problem, a transmit power sufficiently smaller than the transmit power estimated through open-loop power control, for example, −12 dB to −9 dB, is configured to be used for transmission.

Accordingly, when direct communication between the terminals is performed using sidelink channels (i.e., PSCCH and PSSCH) to which the open-loop power control is applied as described above, a probability of successful reception decreases, which causes unnecessary PSSCH (re) transmission. Accordingly, when using the scheme in which a PSCCH and a PSSCH corresponding thereto are transmitted in the same slot in the 5G NR sidelink scenario, since the PSSCH is transmitted even in a situation where reception of the PSCCH fails due to an error in the open-loop power control, power consumption of the terminal is increased and unnecessary interference is also caused to degrade the uplink call quality.

Therefore, in the 5G NR sidelink communication, there is a need for a method and apparatus for resolving the above-described problems such as the resource consumption, terminal power consumption, and influence of interference on uplink reception, which may occur in transmission of a PSCCH and a PSSCH corresponding thereto in the same slot using the open-loop power control scheme. In addition, in the 5G NR sidelink communication, there is a need to improve the PSCCH and PSSCH transmission schemes to provide reliable sidelink communication.

In the following description, a method and apparatus realizing a technique for securing sidelink communication performance will be described.

Figure 9:
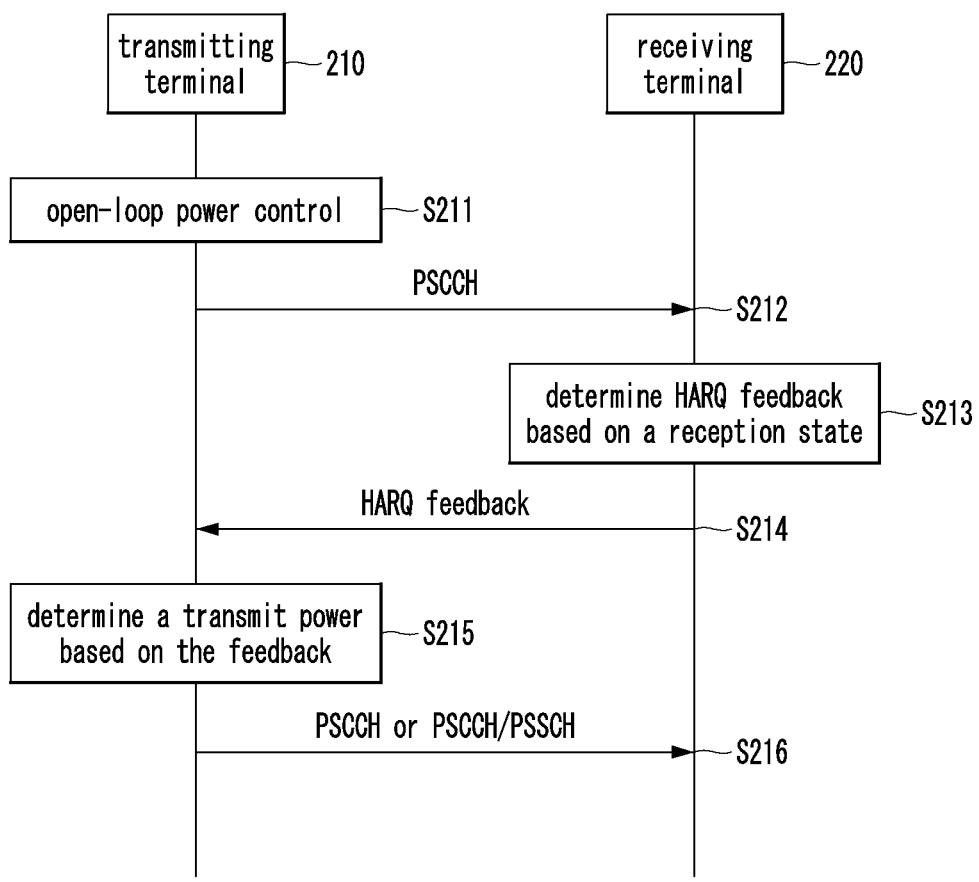
FIG. 9 is a sequence chart illustrating an operation between a transmitting terminal and a receiving terminal when sidelink control channel transmit power ramping according to the present disclosure is applied.

FIG. 9 is a sequence chart illustrating an operation between a transmitting terminal and a receiving terminal when sidelink control channel transmit power ramping according to the present disclosure is applied.

A transmitting terminal 210 may be a terminal that transmits user data, signaling, and/or control signals in sidelink communication, and a receiving terminal 220 may be a terminal that receives the user data, signaling and/or control signals in the sidelink communication. For example, during sidelink communication in the unicast mode, terminals transmitting data, signaling, and/or control signals may be interchanged. As another example, during sidelink communication in the groupcast mode, a terminal transmitting user data to a plurality of terminals belonging to a group may be the transmitting terminal 210, and terminals receiving user data from one specific terminal may be the receiving terminal 220.

In the following description, the operation of FIG. 9 will be described as a method of determining a transmit power during sidelink communication in the unicast mode.

In a step S211, the transmitting terminal 210 may determine a transmit power of a control channel to be transmitted using an open-loop power control method. Since the open-loop power control method is a widely known technique in the field of mobile communication, a detailed description thereof will be omitted.

In a step S212, the transmitting terminal 210 may transmit a PSCCH with the transmit power determined based on the open-loop power control method. Although only the transmission of the PSCCH is illustrated in FIG. 9, the PSCCH may be transmitted together with a PSSCH as in FIGS. 7 and 8 described above. However, in the exemplary embodiment of FIG. 9 according to the present disclosure, only the PSCCH may be transmitted.

In the step S212, the receiving terminal 220 may attempt to detect a control channel or both of a control channel and a data channel. In FIG. 9 according to an exemplary embodiment of the present disclosure, the transmitting terminal 210 transmits only the PSCCH. Accordingly, the receiving terminal 210 may not detect a data channel in the step S212 and may perform demodulation and decoding of the received control channel, for example, the PSCCH.

In a step S213, the receiving terminal 210 may determine a HARQ feedback based on the demodulation and decoding result of the control channel. If the transmitting terminal 210 transmits the control channel together with a data channel, the receiving terminal 220 may operate according to one of three operations in the unicast communication mode described above in FIG. 8 when determining the HARQ feedback.

For example, the receiving terminal 220 may transmit ACK when demodulation and decoding of control information transmitted on the control channel and user data transmitted on the data channel are successful.

As another example, if the receiving terminal 220 succeeds in demodulation and decoding of the control information transmitted on the control channel, but fails to demodulate and decode the user data transmitted on the data channel, the receiving terminal 220 may transmit NACK.

As yet another example, the receiving terminal 220 may not transmit any signal when demodulation and decoding of both the control information transmitted on the control channel and the user data transmitted on the data channel fail. In this case, no signal is transmitted because it cannot be identified whether the transmitting terminal 210 has actually transmitted a signal. The ACK and NACK may be transmitted through a reserved resource, such as the PSFCH described above with reference to FIGS. 7 and 8.

In FIG. 9 according to the present disclosure, it is assumed that only the PSCCH is transmitted. Therefore, there is no data transmitted on a PSSCH. Therefore, the receiving terminal 220 may fail even when it attempts to demodulate and decode because there is no data transmitted on a PSSCH. Therefore, as illustrated in FIG. 9, when the transmitting terminal 210 transmits only the PSCCH, the receiving terminal 220 may not be able to feedback ACK.

In a step S214, the receiving terminal 220 may transmit the HARQ feedback through a reserved resource such as a PSFCH. The HARQ feedback that can be transmitted by the receiving terminal 220 in the step S214 may be NACK, or the receiving terminal 220 may not transmit any signal (i.e., 'No signal').

In the step S214, the transmitting terminal 210 may receive the feedback from the receiving terminal 220. In general, the transmitting terminal 210 may receive ACK or NACK, or may not receive any signal (i.e., No Signal). However, in the case of FIG. 9, the transmitting terminal may receive NACK or may not receive any signal (i.e., No Signal).

In a step S215, the transmitting terminal 210 may determine a transmit power based on the HARQ feedback received in the step S214. The transmitting terminal 210 may determine the transmit power according to which signal is received from the receiving terminal 220. The transmitting terminal 210 may identify whether the receiving terminal 220 has succeeded in demodulating and decoding the control channel based on the signal received in the step S214. Depending on whether the demodulation and decoding of the control channel succeeds, the receiving terminal 220 may transmit NACK or may not transmit any signal (i.e., No Signal). Accordingly, the reception of NACK at the transmitting terminal 210 may correspond to a case in which the receiving terminal 220 successfully receives the control channel but fails to receive (or demodulate and decode) a data channel. In addition, that the transmitting terminal 210 does not receive any signal (i.e., No Signal) indicates a case in which the receiving terminal 220 does not successfully receive the control channel.

The transmitting terminal 210 may determine a PSCCH transmit power or a PSCCH/PSSCH transmit power based on the received signal in the step S215. Determination of the PSCCH transmit power or the PSCCH/PSSCH transmit power may be performed as follows.

When NACK is detected in the HARQ feedback, the transmitting terminal 210 according to the present disclosure may determine a PSCCH/PSSCH transmit power. On the other hand, when no signal is transmitted as the HARQ feedback, the transmitting terminal 210 according to the present disclosure may re-determine only the PSCCH transmit power.

Specifically, when NACK is detected in the HARQ feedback, the transmitting terminal 210 may identify that the transmit power set for transmitting the PSCCH in the step S212 is sufficient for the receiving terminal 220 to receive, demodulate and decode the PSCCH. Accordingly, in the step S215, the transmitting terminal 210 may determine a PSCCH transmit power as the transmit power previously set in the step S212. Also, the transmitting terminal 210 may determine a transmit power of a PSSCH to be transmitted in a step S216 based on the transmit power of the PSCCH determined in the step S215. The transmit power of the PSSCH may be the same as the transmit power of the PSCCH or higher by a preset value than the transmit power of the PSCCH.

On the other hand, when no signal is received in a symbol promised for the HARQ feedback, the transmitting terminal 210 may identify that the transmit power set for transmitting the PSCCH in the step S212 is insufficient for the receiving terminal to receive, demodulate and decode the PSCCH. Accordingly, the transmitting terminal 210 according to the present disclosure may determine a PSCCH transmit power as a new value in the step S215. For example, the transmit power of the PSCCH determined in the step S215 may be set to a value higher than the power value set in the step S211. In this case, the power value higher than the power value set in the step S211 may be a value obtained by adding a preset specific power value to the power value set in the step S211.

In the step S216, the transmitting terminal 210 may transmit only a PSCCH or transmit a PSCCH together with a PSSCH based on the transmit power determination in the step S215. The case where the transmitting terminal 210 transmits only the PSCCH may correspond to the case where the transmitting terminal did not receive any signal in the HARQ feedback resource in the step S214. The case where the transmitting terminal 210 transmits both the PSCCH and PSSCH may correspond to the case where the transmitting terminal received NACK in the HARQ feedback resource.

Using the method illustrated in FIG. 9, the power required for data transmission may be accurately known by using HARQ feedback before actual data transmission between the transmitting terminal 210 and the receiving terminal 220. Accordingly, unnecessary power consumption of the transmitting terminal 210 caused by a PSSCH transmission failure can be prevented. In addition, interference of the PSSCH that has failed in transmission from the transmitting terminal 210 to the receiving terminal 220 on sidelink communication of another terminal or uplink communication of the base station can be reduced.

FIGS. 10A and 10B are exemplary diagrams for describing transmit power ramping when a transmitting terminal transmits sidelink control channels according to an exemplary embodiment of the present disclosure.

Hereinafter, an operation of a transmitting terminal using transmit power ramping of control channels in a sidelink unicast mode according to the present disclosure will be described with reference to FIGS. 10A and 10B.

Referring to FIG. 10A, the transmitting terminal 210 described with reference to FIG. 9 may transmit a first control channel (e.g., PSCCH 230) through an allocated resource. In this case, a transmit power of the first control channel 230 may be a transmit power Po determined by the open-loop power control method as in the step S211 described with reference to FIG. 9.

The transmitting terminal 210 may then attempt to detect a signal in a predetermined HARQ feedback resource as in the step S214 described with reference to FIG. 9. In FIG. 10A, a 'No Signal' state in which no signal is detected in the HARQ feedback resource is exemplified. When a signal is not detected in the HARQ feedback resource, the transmitting terminal 210 may transmit a second control channel 231 in the next resource. In this case, the second control channel 231 may be transmitted with a transmit power increased by a preset power increment $\Delta P$ from the transmit power Po determined by the open-loop power control method. In FIG. 10A, the transmit power increased by the preset power increment $\Delta P$ from the transmit power $P_0$ is denoted as $P_1$.

The transmitting terminal 210 may attempt to detect a signal in the corresponding HARQ feedback resource after transmitting the second control channel 231. FIG. 10A illustrates a case in which there is no HARQ feedback signal even after transmission of the second control channel 231.

When the transmitting terminal 210 determines 'No Signal' even for the feedback signal for the second control channel 231, the transmitting terminal 210 may transmit a third control channel 232 with a transmit power $P_2$ increased by $\Delta P$ from the transmit power $P_1$ applied to the second control channel 231 at the next control channel transmission timing.

In FIG. 10A, after the transmitting terminal 210 transmits the third control channel 232, the receiving terminal 220 may transmit a HARQ feedback signal 233 through a predetermined resource, for example, a PSFCH. Accordingly, the transmitting terminal 210 may receive NACK as a HARQ feedback as in the step S214 described with reference to FIG. 9.

FIG. 10B is an exemplary diagram for describing timings subsequent to the timings of FIG. 10A. Therefore, also in FIG. 10B, the horizontal axis means time and the vertical axis means power. However, the power of the vertical axis is different from that of FIG. 10A in that the scale is different. In addition, in FIG. 10A, a timing at which the receiving terminal 220 transmits NACK corresponds to the end of the timing diagram. In FIG. 10B, the timing at which the receiving terminal 220 transmits NACK corresponds to the start of the timing diagram. That is, the timing at which NACK is transmitted as the HARQ feedback signal 233 in FIG. 10A may correspond to the timing at which NACK is transmitted as the HARQ feedback signal 233 in FIG. 10B.

Referring to FIG. 10B, the transmitting terminal 210 may detect that NACK is transmitted as the HARQ feedback signal 233. As described with reference to FIG. 10A, the transmitting terminal 210 may be in a state of having transmitted only the first control channel 230, the second control channel 231, and the third control channel 232. Therefore, the transmitting terminal 210 may transition to a state in which it receives NACK as the HARQ feedback signal 233 or a state in which it receives no signal.

Accordingly, reception of NACK at the transmitting terminal 210 may indicate that the transmit power of the third control channel 232 is an appropriate power that can be detected by the receiving terminal 220. Accordingly, the transmitting terminal 210 may transmit a fourth control channel 234 and a first data channel 235 in a reserved resource of the next timing. In this case, a transmit power of the fourth control channel 234 may be determined based on the transmit power of the third control channel 232. For example, the fourth control channel 234 may be determined to have the same power $P_2$ as that of the third control channel 232 described above. Also, the transmitting terminal 210 may determine a transmit power of the first data channel 235 based on the transmit power of the third control channel 232. In FIG. 10B, the transmit power of the first data channel is denoted as $P_3$.

The transmitting terminal 210 may use the respective powers $P_2$ and $P_3$ determined for the fourth control channel 234 and the first data channel 235 to transmit the fourth control channel 234 and the first data channel 235.

Thereafter, the transmitting terminal 210 may receive a HARQ feedback signal 236 through a predetermined resource. FIG. 10B illustrates a case in which NACK is received as the HARQ feedback signal 236. When NACK is received, the transmitting terminal 210 may recognize that the transmit power of the actually-transmitted first data channel 235 is insufficient.

Accordingly, the transmitting terminal 210 may determine a transmit power of a second data channel 238 as a power $P_4$ higher than the transmit power of the first data channel 235. In addition, reception of NACK at the transmitting terminal 210 may mean that the receiving terminal 220 has received the control channel, and succeeded in demodulation and decoding thereof. Accordingly, a transmit power of a fifth control channel 237 may be determined as the same power $P_2$ as that of the previous fourth control channel 234.

As another power determination method according to the present disclosure, when determining the transmit power of the second data channel 238, the open-loop power control, the transmit power of the fourth control channel 234 and the transmit power of the first data channel 235 may be considered. Therefore, in FIG. 10B, the transmit power of the second data channel 238 is determined to be higher than that of the first data channel 235, but when a distance between the receiving terminal 220 and the transmitting terminal 210 becomes close or when a propagation environment therebetween is improved, the transmit power of the second data channel 238 may have a value different from the transmit power exemplified in FIG. 10B. Similarly to the determination of the transmit power of the second data channel 238, the transmit power of the fifth control channel 237 may also be determined in consideration of the open-loop power control, the transmit power of the fourth control channel 234, and the transmit power of the first data channel 235.

Since the transmitting terminal 210 has received NACK through the HARQ feedback resource corresponding to the first data channel 235, the fifth control channel 237 and the second data channel 238 may be respectively transmitted using the transmit powers $P_2$ and $P_4$ determined therefor in the next reserved resource.

The transmitting terminal 210 may receive a HARQ feedback signal 238 through a predetermined resource in response to transmission of the fifth control channel 237 and the second data channel 238. FIG. 10B illustrates a case in which ACK is received as the HARQ feedback signal 238. When ACK is received as the HARQ feedback signal 238, the transmitting terminal 210 may determine that the corresponding sidelink data transmission is successful and complete the procedure.

Meanwhile, control channels transmitted without corresponding data channels, such as the first control channel 230, the second control channel 231, and the third control channel 232 described above, may be configured to include the same control information.

On the other hand, since the fourth control channel 234 and the fifth control channel 237 are associated with the first data channel 235 and the second data channel 238, respectively, they may carry different control information according to a change in allocated resources. In addition, the first data channel 235 and the second data channel 238 are generated based on the same data, and signals used for actual transmissions therefor may be generated by different symbols selected from among coded symbols according to a HARQ retransmission procedure.

In addition, the number of transmissions of a control channel that is not transmitted together with a data channel, such as the first control channel 230, the second control channel 231, and the third control channel 232, may be limited by setting it to a predetermined number. The transmitting terminal 210 may not receive a HARQ feedback signal (i.e., No Signal) through a predetermined resource as in the step S214 described with reference to FIG. 9 even though it has performed transmission of the control channel by the set number. As such, when a HARQ feedback signal is not received, the transmitting terminal 210 may determine that the corresponding sidelink data transmission has failed and complete the procedure. In this case, the set number of transmissions may include '0'. When the set number of transmissions is 0, the transmit powers of the fourth control channel 234 and the first data channel 235 may use the transmit power determined in the open-loop power control step S211.

In addition, the maximum number of transmissions of a control channel and a data channel in the same slot, such as the first data channel 235 transmitted with the fourth control channel 234 or the second data channel 238 transmitted with the fifth control channel 237, may be set to a predetermined number. Even though the transmitting terminal 210 has performed transmission of the control channel and the data channel by the set number, when a HARQ feedback signal through a predetermined resource is NACK or 'No Signal' as in the step S214, the transmitting terminal 210 may determine that the corresponding sidelink data transmission has failed, and complete the procedure. In this case, the set maximum number of transmissions may include '1' to prevent retransmission.

In addition, an upper limit of a transmit power of a control channel that is not transmitted together with a data channel, such as the first control channel 230, the second control channel 231, and the third control channel 232, may be set. In a situation in which transmissions have not be performed by the set number of transmissions, if the set upper limit of the transmit power is exceeded, the transmitting terminal 210 may continue to transmit the control channel with the transmit power corresponding to the upper limit, or determine that the corresponding sidelink data transmission has failed, and complete the procedure.

Figure 11:
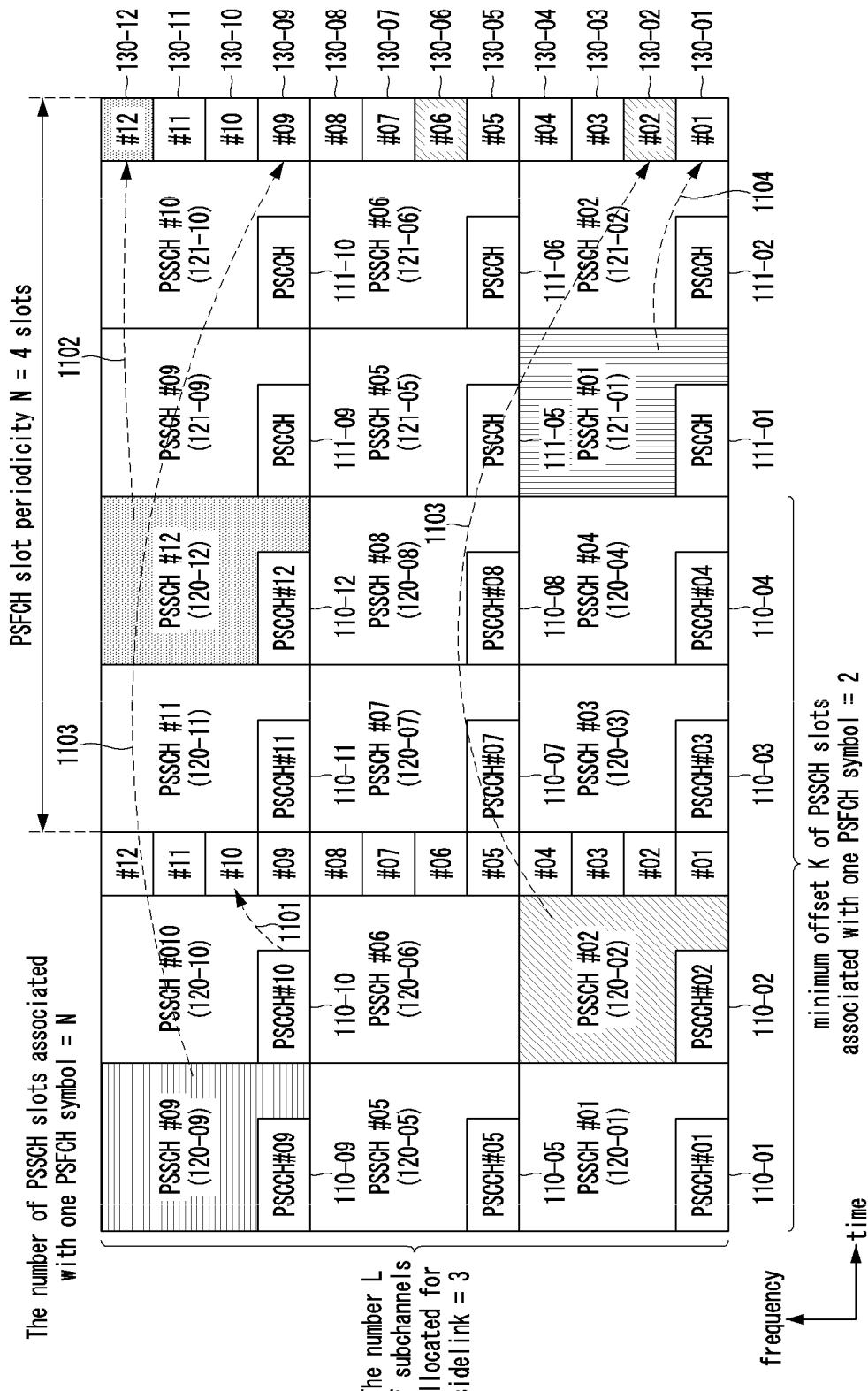
FIG. 11 is an exemplary diagram for describe resource usage in a sidelink channel transmission scenario according to an exemplary embodiment of the present disclosure.

FIG. 11 is an exemplary diagram for describe resource usage in a sidelink channel transmission scenario according to an exemplary embodiment of the present disclosure.

When compared with FIG. 7 before referring to FIG. 11, it can be seen that they have the same form. That is, as in FIG. 7, the number N of PSSCH slots associated with one PSFCH symbol is four, the number L of subchannels allocated to a sidelink is three, a PSFCH periodicity N is four slots, and a minimum offset K of PSSCH slots associated with one PSFCH symbol is two.

Therefore, in FIG. 11, the same reference numerals as in FIG. 7 are used for the respective resources, for example, PSSCHs, PSCCHs, and PSFCHs.

In FIG. 11, a transmission method according to the present disclosure that is different from that of FIG. 7 described above will be described, and will be described in comparison with FIG. 7 described above.

In the sidelink channel transmission scenario according to the exemplary embodiment of FIG. 7 described above, both the sidelink control channel and the sidelink data channel are transmitted in all resources (slots and subchannels, etc.). On the other hand, in the sidelink channel transmission scenario illustrated in FIG. 11 according to the present disclosure, both the sidelink control channel and the sidelink data channel are transmitted only in some resources, and only the sidelink control channel is transmitted in the remaining resources. That is, as described above with reference to FIG. 9, before transmitting the sidelink data channel, the transmitting terminals may identify an appropriate transmit power by transmitting only the control channel.

Due to such the difference, in the sidelink channel transmission scenario according to the present disclosure, power consumption of terminals can be relatively reduced and the interference effect on the uplink can be reduced.

In the unicast mode sidelink providing direct communication between terminals according to the present disclosure, the sidelink channel transmission scenario based on the transmit power ramping of control channels may use the HARQ feedback scheme for the data channel, which is defined in the 5G NR technical specifications, as it is.

As another example, in the unicast mode sidelink providing direct communication between terminals according to the present disclosure, the sidelink channel transmission scenario based on transmit power ramping of control channels may use a modified HARQ feedback scheme for the data channel. A new HARQ feedback scheme for a data channel that can more effectively realize a low-latency according to the present disclosure will be described with reference to FIG. 11.

In the unicast mode sidelink channel transmission scenario according to the present disclosure, a feedback signal for a control channel may be additionally adopted. For example, by newly defining a control channel feedback signal on whether or not reception of a control channel is successful, it may be distinguished from a feedback signal of a data channel. This may achieve a gain of reducing a sidelink channel transmission latency by realizing faster transmit power ramping of the control channel by quickly feeding back a feedback signal for the control channel having a short reception processing time.

A method of distinguishing between a feedback signal for a control channel and a feedback signal for a data channel according to the present disclosure will be described.

When a feedback signal is transmitted according to the method presented in the 5G NR specifications in the sidelink channel transmission method illustrated in FIGS. 7 and 11, a time delay of at least 2 slots and a maximum of 5 slots may occur at a time of feedback transmission.

More specifically, referring to FIG. 7, a feedback for the PSSCH 120-12 and the PSCCH 110-12 may be transmitted through the resource of the PSFCH 130-12 after 2 slots therefrom. That is, a latency of 2 slots occurs.

A feedback signal for the PSSCH 120-09 and the PSCCH 110-09, which is located in the earliest slot for which feedback is transmitted through the same PSFCH resource, may be transmitted through the resource of the PSFCH #09 130-09 after 5 slots therefrom. Therefore, in the case of using the method of the NR specifications, a delay of a minimum of 2 slots and a maximum of 5 slots may occur for feedback.

In contrast, in the present disclosure, the latency of the feedback signal of the control channel may be reduced to a minimum of 0 slot and a maximum of 3 slots. Specifically, for example, in the case of the PSCCH 110-10, according to the NR specification, a feedback therefor should be made through the PSFCH 130-10 together with the corresponding PSSCH 120-10. However, in the present disclosure, as indicated by a reference numeral 1101, the feedback for the control channel of PSCCH 110-10 may be transmitted on the PSFCH 120-10. By newly defining a feedback signal for a control channel, the respective PSFCH resources may be used by distinguishing between a data channel feedback signal and a control channel feedback signal.

However, even in the present disclosure, the NR specification may be used as it is for feedback on a data channel. For example, the feedback on the PSSCH 120-12 of FIG. 11 may be transmitted on the PSFCH 130-12 as indicated by a reference numeral 1102, and the feedback on the PSSCH 120-09 may be transmitted on the PSFCH 130-09 as indicated by a reference numeral 1103.

In summary, according to the NR specification, a latency corresponding to the number of slots based on the number of PSSCH slots associated with a PSFCH symbol among slots transmitted at least 2 slots before a feedback resource may occur. Therefore, the latency of the PSCCH associated with the PSSCH also has the same latency. On the other hand, according to the present disclosure, all PSCCHs included within a PSFCH period may be directly fed back through a PSFCH symbol. Therefore, when using the method according to the present disclosure, it is possible to minimize the latency.

Figure 12A:
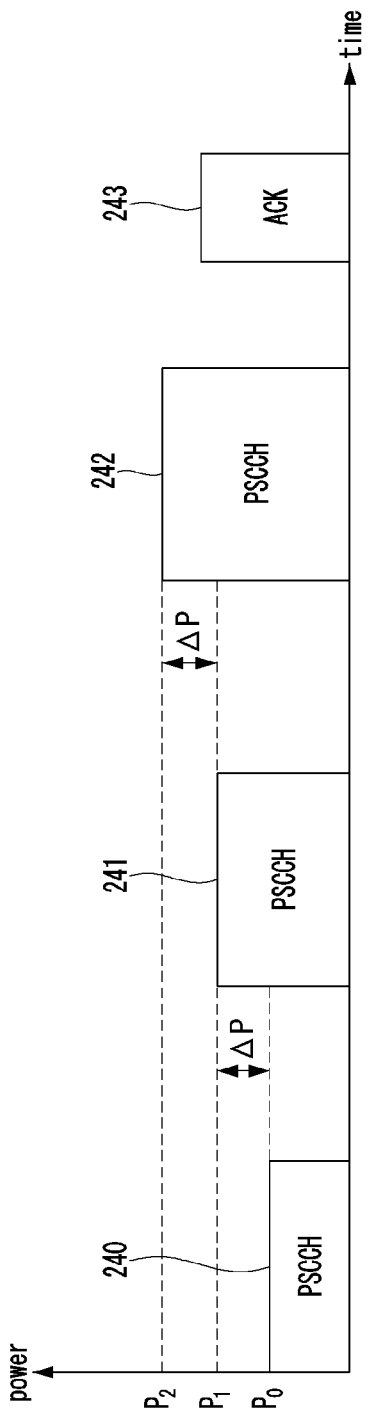
FIGS. 12A and 12B are exemplary diagrams for describing transmit power ramping when a transmitting terminal transmits sidelink control channels according to an exemplary embodiment of the present disclosure.
Figure 12B:
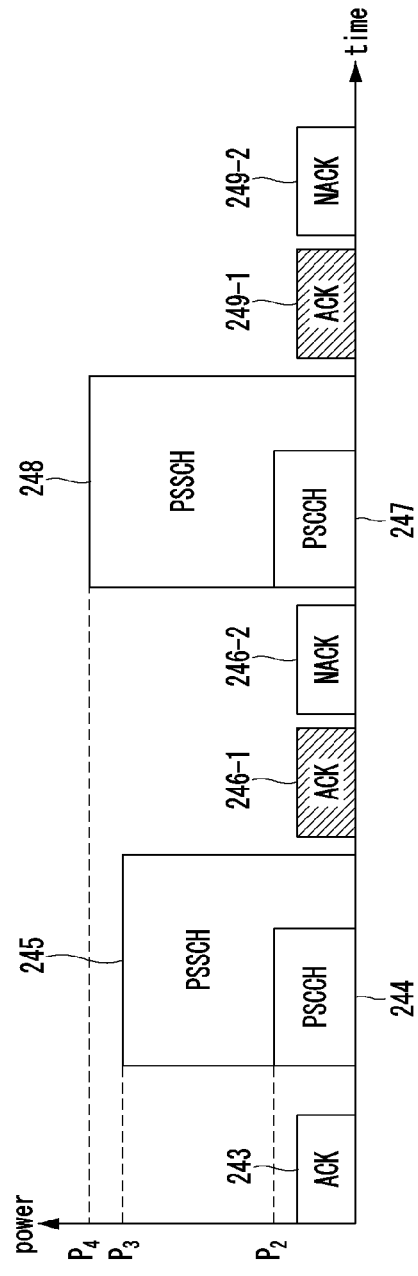

FIGS. 12A and 12B are exemplary diagrams for describing transmit power ramping when a transmitting terminal transmits sidelink control channels according to an exemplary embodiment of the present disclosure.

The scenario of FIGS. 12A and 12B is a scenario applying the above-described method for distinguishing between a feedback signal for a control channel and a feedback signal for a data channel.

In FIG. 12A, the horizontal axis may mean time, and the vertical axis may mean power. Hereinafter, a method for a transmitting terminal to determine a sidelink transmit power according to the present disclosure will be described with reference to FIG. 12A. In addition, according to the present disclosure, a control channel feedback scheme illustrated in FIGS. 12A and 12B may use an ACK-based feedback that adopts the 'ACK-No signal' scheme rather than the 'ACK-NACK' scheme.

Referring to FIG. 12A, the transmitting terminal 210 may transmit a first control channel 240, for example, a PSCCH, to the receiving terminal 220 through an allocated resource. In this case, a transmit power of the first control channel 240 may be a transmit power Po determined by the open-loop power control method. Thereafter, the transmitting terminal 210 may attempt to detect a signal in a predetermined HARQ feedback resource. In FIG. 12A, a 'No Signal' state in which no signal is detected in the HARQ feedback resource is exemplified. When a signal is not detected in the HARQ feedback resource, the transmitting terminal 210 may transmit a second control channel 241 in the next resource. In this case, the second control channel 241 may be transmitted with a transmit power increased by a preset power increment ΔP from the transmit power used for the first control channel 240. In FIG. 12A, the transmit power increased by the preset power increment ΔP from the transmit power $P_0$ determined by the open-loop power control method is denoted as $P_1$. In addition, the transmitting terminal 210 may attempt to detect a signal in the corresponding HARQ feedback resource after transmitting the second control channel 241. In FIG. 12A, there is no HARQ feedback signal even after transmission of the second control channel 241. When the transmitting terminal 210 determines 'No Signal' also as the feedback for the second control channel 241, the transmitting terminal 210 may transmit a third control channel 242 with a transmit power $P_2$ increased by ΔP from the transmit power applied to the second control channel 241 at the next control channel transmission timing.

The content described above may be the same operation as that of FIG. 10A. FIG. 12A exemplifies a case in which the receiving terminal 220 that has received the third control channel 242 transmits the HARQ feedback signal 243 through a predetermined resource, for example, a PSFCH. In the case of FIG. 10, the 'ACK-NACK' scheme is used, but the case of FIG. 12A is based on the 'ACK-No Signal' scheme, and as described above, feedbacks for the control channel and the data channel are transmitted separately. Accordingly, when the receiving terminal 220 receives the third control channel 242 and succeeds in demodulation and decoding thereof, ACK may be transmitted as the HARQ feedback signal 243.

FIG. 12B is an exemplary diagram for describing timings subsequent to the timings of FIG. 12A. Therefore, also in FIG. 12B, the horizontal axis means time and the vertical axis means power. However, the power of the vertical axis is different from that of FIG. 12A in that the scale is different. In addition, in FIG. 12A, a timing at which the receiving terminal 220 transmits ACK corresponds to the end of the timing diagram. In FIG. 12B, a timing at which the receiving terminal 220 transmits ACK corresponds to the start of the timing diagram. That is, the timing at which the ACK is transmitted as the HARQ feedback signal 243 in FIG. 12A may correspond to the timing at which the ACK is transmitted as the HARQ feedback signal 243 in FIG. 12B.

Referring to FIG. 12B, the transmitting terminal 210 may detect that ACK is transmitted as the HARQ feedback signal 243. Reception of ACK as the transmitting terminal 210 may indicate that the transmit power of the third control channel 242 is an appropriate power that can be detected by the receiving terminal 220. Accordingly, the transmitting terminal 210 may transmit a fourth control channel 244 and a first data channel 245 in a reserved resource of the next timing. In this case, a transmit power of the fourth control channel 244 may be determined based on the transmit power of the third control channel 242. For example, the transmit power of the fourth control channel 244 may be determined as the same power $P_2$ as that of the third control channel 242 described above. In addition, the transmitting terminal 210 may determine a transmit power of the first data channel 245 based on the transmit power of the third control channel 242. In FIG. 12B, the transmit power of the first data channel 255 is denoted as $P_3$.

The transmitting terminal 210 may use the respective transmit powers $P_2$ and $P_3$ determined for the fourth control channel 244 and the first data channel 245 to transmit the fourth control channel 244 and the first data channel 245, respectively.

Thereafter, the transmitting terminal 210 may receive a HARQ feedback signal through a predetermined resource. In this case, in the exemplary embodiments of FIGS. 12A and 12B according to the present disclosure, it is assumed that the HARQ feedbacks for the control channel and the data channel are transmitted separately. Accordingly, feedback for each of the fourth control channel 244 and the first data channel 245 may be performed.

FIG. 12B exemplifies a case in which a control channel feedback 246-1 for the fourth control channel 244 is transmitted as ACK, and a data channel feedback 246-2 for the first data channel 245 is transmitted as NACK. Accordingly, the transmitting terminal 210 may determine a transmit power of a fifth control channel 247 to be the same power $P_2$ as that of the previous fourth control channel 244. In addition, the transmitting terminal 210 may determine a transmit power of a second data channel 248 as a power $P_4$ higher than the transmit power of the first data channel 245.

As another determination method of the transmit power of the second data channel 248, as described above with reference to FIG. 10B, the transmit power of the second data channel 248 may be determined in consideration of the open-loop power control, the transmit power of the fourth control channel 244, and the transmit power of the first data channel 245.

Thereafter, when the transmitting terminal 210 receives ACK as a feedback 249-1 for the control channel and 'ACK' as a feedback 249-2 for the data channel in a HARQ feedback reception step S214 as in FIG. 9 described above, the transmitting terminal 210 may determine that the sidelink data transmission is successful, and complete the procedure.

In the above procedure, the first control channel 240, the second control channel 241, and the third control channel 242 transmitted in FIG. 12A may be transmitted by the same procedure as that of the first control channel 230, the second control channel 231, and the third control channel 232 in FIG. 10A. However, using the method described above with reference to FIG. 11, the feedback for the control channel can be received more quickly. Therefore, a time interval between the respective control channels may be significantly reduced.

In addition, since the data channel is transmitted only when reception of the control channel is successful as described in FIG. 9, interference can be reduced.

FIGS. 13A and 13B are exemplary diagrams for describing transmit power ramping when a transmitting terminal transmits sidelink control channels according to an exemplary embodiment of the present disclosure.

The scenario of FIGS. 13A and 13B may be a scenario in which the above-described method for distinguishing between a feedback signal for a control channel and a feedback signal for a data channel is applied.

In FIG. 13A, the horizontal axis may mean time, and the vertical axis may mean power. Then, with reference to FIG. 13A, a method for the transmitting terminal to determine a transmit power according to the present disclosure will be described. In addition, in FIGS. 13A and 13B according to the present disclosure, as in FIGS. 12A and 12B described above, a feedback for a control channel may use the ACK-based feedback scheme (i.e., 'ACK-No Signal' scheme) instead of the 'ACK-NACK' scheme. In addition, in FIGS. 13A and 13B, a feedback signal for a data channel may also use the ACK-based feedback scheme (i.e., 'ACK-No Signal' scheme) instead of the 'ACK-NACK' scheme. That is, when a data channel is successfully received, ACK is fed back, and when a data channel is not successfully received, no signal is fed back (i.e., No Signal).

Referring to FIG. 13A, the transmitting terminal 210 may transmit a first control channel 250, for example, a PSCCH, to the receiving terminal 220 through an allocated resource. In this case, a transmit power of the first control channel 250 may be a transmit power Po determined by the open-loop power control method. Thereafter, the transmitting terminal 210 may attempt to detect a signal in a predetermined HARQ feedback resource. FIG. 13A exemplifies a 'No Signal' state in which no signal is detected in a HARQ feedback resource. When a signal is not detected in a HARQ feedback resource, the transmitting terminal 210 may transmit a second control channel 251 in the next resource. In this case, the second control channel 251 may be transmitted with a transmit power increased by a preset power increment ΔP from the transmit power previously used for the first control channel 250. In FIG. 13A, the transmit power increased by the preset power increment ΔP from the transmit power Po determined by the open-loop power control method is denoted as Pi. In addition, the transmitting terminal 210 may attempt to detect a signal in the corresponding HARQ feedback resource after transmitting the second control channel 251. FIG. 13A exemplifies a case in which there is no HARQ feedback signal even after transmission of the second control channel 251. When the transmitting terminal 210 determines that there is no feedback signal for the second control channel 251, the transmitting terminal 210 may transmit a third control channel 252 with a transmit power $P_2$ increase by the preset power increment ΔP from the transmit power used for the second control channel 251 at the next control channel transmission timing.

FIG. 13A exemplifies a case in which the receiving terminal 220 that has received the third control channel 252 transmits a HARQ feedback signal 253 through a predetermined resource, for example, a PSFCH. The case of FIG. 12A is based on the 'ACK-No Signal' scheme, and as described above, feedbacks for the control channel and the data channel are transmitted separately. Accordingly, when the receiving terminal 220 receives the third control channel 252 and succeeds in demodulation and decoding thereof, the receiving terminal 220 may transmit ACK as the HARQ feedback signal 253.

The above description may be the same procedure as that of FIG. 12A described above.

FIG. 13B is an exemplary diagram for describing timings subsequent to the timings of FIG. 13A. Therefore, also in FIG. 13B, the horizontal axis means time, and the vertical axis means power. However, the power of the vertical axis is different from that of FIG. 13A in that the scale is different. In addition, in FIG. 13A, a timing at which the receiving terminal 220 transmits ACK corresponds to the end of the timing diagram. In FIG. 13B, a timing at which the receiving terminal 220 transmits ACK corresponds to a start of the timing diagram. That is, the timing at which ACK is transmitted as the HARQ feedback signal 253 in FIG. 13A may correspond to the timing at which ACK is transmitted as the HARQ feedback signal 253 in FIG. 13B.

Referring to FIG. 13B, the transmitting terminal 210 may detect that ACK is transmitted as the HARQ feedback signal 253. The reception of ACK at the transmitting terminal 210 may indicate that the transmit power of the third control channel 252 is an appropriate power that can be detected by the receiving terminal 220. Accordingly, the transmitting terminal 210 may transmit a fourth control channel 254 and a first data channel 255 in a reserved resource of the next timing. In this case, a transmit power of the fourth control channel 254 may be determined based on the transmit power of the third control channel 252. For example, the transmit power of the fourth control channel 254 may be determined to have the same power $P_2$ as that of the third control channel 252 described above. In addition, the transmitting terminal 210 may determine a transmit power of the first data channel 255 based on the transmit power of the third control channel 252. In FIG. 13B, the transmit power of the first data channel 255 is denoted as $P_3$.

The transmitting terminal 210 may use the respective transmit powers $P_2$ and $P_3$ determined for the fourth control channel 254 and the first data channel 255 to transmit the fourth control channel 254 and the first data channel 255, respectively.

Thereafter, the transmitting terminal 210 may receive a HARQ feedback signal through a predetermined resource. In this case, in the exemplary embodiments of FIGS. 13A and 13B according to the present disclosure, it is assumed that HARQ feedbacks for the control channel and the data channel are transmitted separately. Accordingly, feedbacks for the fourth control channel 254 and the first data channel 255 may be performed, respectively. In addition, in FIGS. 13A and 13B, the ACK-based feedback scheme (i.e., 'ACK-No Signal' scheme) is used not only for the control channel but also for the data channel.

FIG. 13B exemplifies a case in which a control channel feedback 256-1 for the fourth control channel 254 is transmitted as ACK, and a data channel feedback 246-2 for the first data channel 255 is not transmitted (i.e., No Signal). Accordingly, the transmitting terminal 210 may determine that transmission of the fourth control channel 254 is successful, but may determine that transmission of the first data channel 255 fails. Accordingly, the transmitting terminal 210 may determine a transmit power of a fifth control channel 257 to be the same power $P_2$ as that of the previous fourth control channel 254. In addition, the transmitting terminal 210 may determine a transmit power of a second data channel 258 as $P_4$ higher than the transmit power of the first data channel 255.

As another determination method of the transmit power of the second data channel 258, the transmit power of the second data channel 258 may be determined in consideration of the open-loop power control, the transmit power of the fourth control channel 254, and the transmit power of the first data channel 255.

Thereafter, when the transmitting terminal 210 receives ACK as a feedback 249-1 for the control channel and receives ACK as a feedback 249-2 for the data channel in the HARQ feedback reception step S214 as shown in FIG. 9 described above, the transmitting terminal 210 may determine that the sidelink data transmission is successful, and complete the procedure.

In the above procedure, the first control channel 240, the second control channel 241, and the third control channel 242 transmitted in FIG. 13A may be transmitted by the same procedure as that of the first control channel 240, the second control channel 241, and the third control channel 242 in FIG. 12A. However, the same effects described with reference to FIGS. 12A and 12B may be achieved.

Since the method according to FIGS. 13A and 13B uses the ACK-based feedback scheme even for the data channel, less signals are transmitted for the feedbacks compared to FIGS. 12A and 12B. Accordingly, there is an advantage that power consumption of the terminal can be reduced and the influence of uplink interference can be reduced.

The control channel (PSCCH) transmit power ramping in the sidelink unicast communication mode according to the present disclosure described above may also be applied in the groupcast communication mode. Hereinafter, a transmit power ramping for control channels according to the present disclosure in the groupcast communication mode will be described.

FIG. 14 is an exemplary diagram for describing a case in which one transmitting terminal and three receiving terminals exist in a groupcast communication mode according to an exemplary embodiment of the present disclosure.

The example of FIG. 14 is an example of a case in which all receiving terminals transmit HARQ feedbacks by the sidelink feedback option 2 for groupcast communication. In addition, FIG. 14 illustrates a control channel transmit power ramping operation to which the ACK-based feedback scheme is applied according to the present disclosure. Here, $N_C$ is the number of receiving terminals transmitting a control channel ACK feedback, $N_D$ is the number of receiving terminals transmitting a data channel ACK feedback, and K is the cumulative number of terminals successfully receiving a data channel.

First, at the time of the first slot, the transmitting terminal may transmit only a control channel, and all the receiving terminals may not successfully receive the control channel (i.e., $N_C=0$, $N_D=0$, K=0). Subsequently, at the time of the second slot, the receiving terminal #0 successfully receives the control channel and feeds back ACK, and the remaining receiving terminals do not successfully receive the control channel (i.e., $N_C=1$, $N_D=0$, K=0).

Due to the ACK fed back by the receiving terminal #0, the transmitting terminal may transmit not only a control channel but also a data channel at the time of the third slot. In the third slot, the receiving terminal #1 successfully receives the control channel and the data channel and feeds back ACK signals therefor, respectively, and the receiving terminal #0 successfully receives only the control channel and feeds back an ACK signal for the control channel. On the other hand, the receiving terminal #2 does not successfully receive any channel (i.e., $N_C=2$, $N_D=1$, K=1). Here, since a difference (i.e., $N_C-N_D$) between the number $N_C$ of receiving terminals transmitting the control channel ACK feedback and the number $N_D$ of receiving terminals transmitting the data channel ACK feedback is 1, the transmitting terminal may transmit not only a control channel but also a data channel at the time of the fourth slot.

In the fourth slot, the receiving terminal #0 successfully receives the control channel and the data channel and feeds back ACK signals therefor, respectively, and the receiving terminal #2 successfully receives only the control channel and feeds back an ACK signal for the control channel. On the other hand, the transmitting terminal may not take an additional operation for the feedback transmitted by the receiving terminal #1 which has already successfully received the data, because it is redundant (N/A) (i.e., $N_C=2$, $N_D=1$, K=2).

Finally, since ($N_C-N_D$) is 1 even at the time of the fifth slot, the transmitting terminal may transmit not only a control channel but also a data channel, and in the fifth slot, the receiving terminal #2 successfully receives the control channel and the data channel and feeds back ACK signals therefor, respectively. As such, when all receiving terminals belonging to the groupcast group successfully receive data, the corresponding sidelink data transmission procedure may be completed (i.e., $N_C=1$, $N_D=1$, K=3).

FIG. 15 is an exemplary diagram for describing a case in which one transmitting terminal and three receiving terminals exist in a groupcast communication mode according to another exemplary embodiment of the present disclosure.

FIG. 15 will also be described using the same parameters as those of FIG. 14 described above. Specifically, FIG. 15 exemplifies an example of a case in which all receiving terminals transmit HARQ feedbacks by the sidelink feedback option 2 for groupcast communication. In addition, $N_C$ is the number of receiving terminals transmitting a control channel ACK feedback, $N_D$ is the number of receiving terminals transmitting a data channel ACK feedback, and K is the cumulative number of terminals successfully receiving a data channel.

Comparing the cases of FIG. 14 and FIG. 15, operations in the first slot and the second slot may be the same. However, in the case of FIG. 15, at the time of the third slot, the receiving terminal #0 successfully receives the control channel and the data channel and feeds back ACK signals therefor, respectively, and all other receiving terminals do not successfully receive the control channel (i.e., $N_C=1$, $N_D=1$, K=1). Therefore, the feedback by the receiving terminal #0 may be excluded from the subsequent procedure, and since all the remaining receiving terminals have not received the control channel (i.e., $N_C-N_D=0$, K≠3), the transmitting terminal may transmit only a control channel at the time of the fourth slot.

Thereafter, since the receiving terminal #2 succeeds in receiving the control channel in the fourth slot, the transmitting terminal may transmit both a control channel and a data channel in the fifth slot. Accordingly, in the fifth slot, ACK signals for the control channel and the data channel are respectively received from the receiving terminal #1, and an ACK signal only for the control channel is received from the receiving terminal #2 (i.e., $N_C=2$, $N_D=1$, K=2).

According to the feedbacks of the fifth slot, since a difference ($N_C-N_D$) between the number $N_C$ of receiving terminals transmitting the control channel ACK feedback and the number $N_D$ of receiving terminals transmitting the data channel ACK feedback is 1, the transmitting terminal may transmit a control channel and a data channel together in the sixth slot. In response to the transmission of the sixth slot, the receiving terminal #2 may feedback ACK signals for both the control channel and the data channel, respectively (i.e., $N_C=1$, $N_D=1$, K=3). Since the reception of the sidelink data is successful in all of the receiving terminals, the transmitting terminal may complete the transmission procedure.

As described above, it can be seen that the sidelink control channel transmit power ramping operation according to the present disclosure can be applied not only in the unicast communication mode but also in the groupcast communication mode using feedback.

Figure 16:
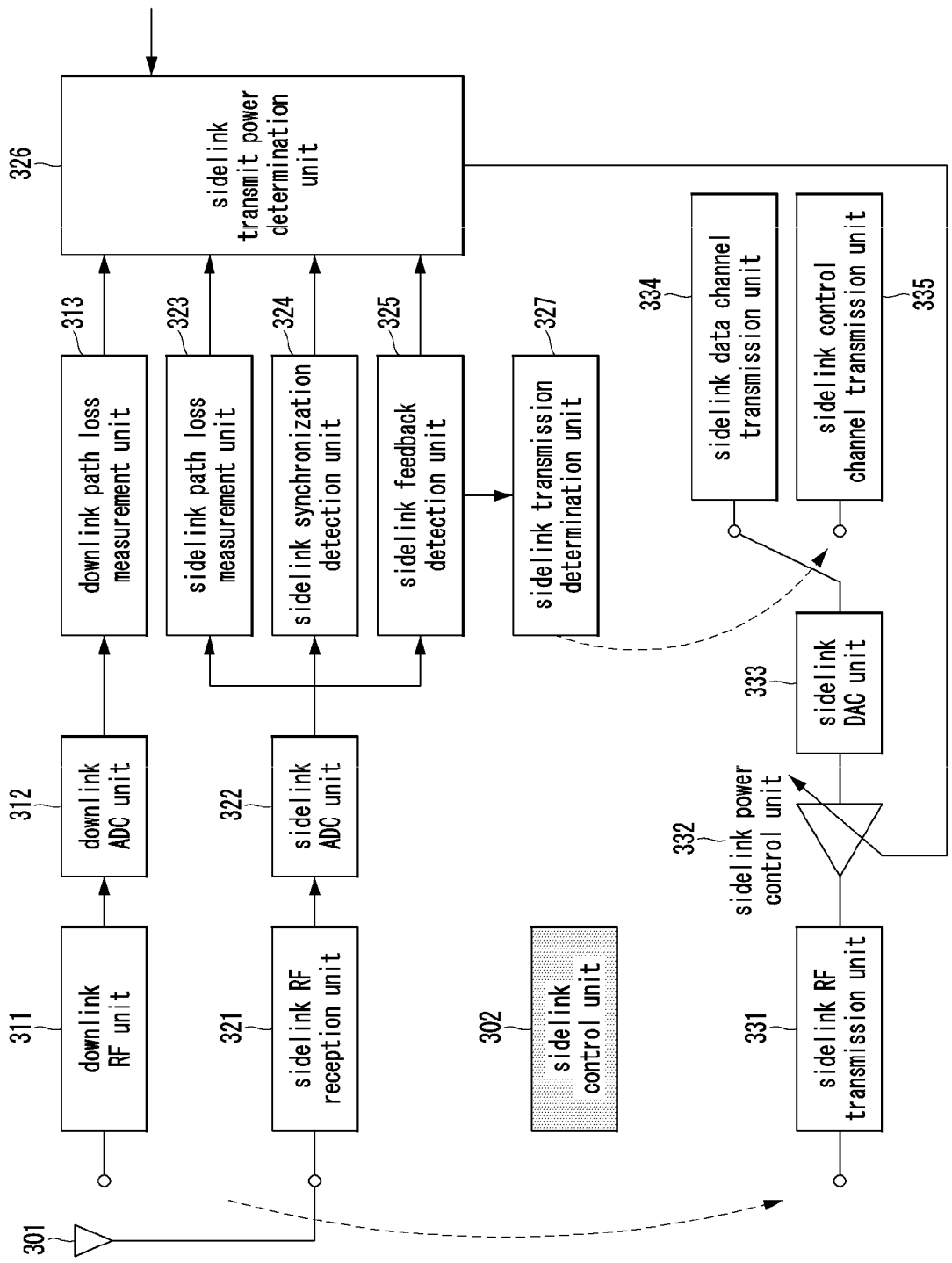
FIG. 16 is a block diagram illustrating a terminal using transmit power ramping of sidelink control channels according to the present disclosure.

FIG. 16 is a block diagram illustrating a terminal using transmit power ramping of sidelink control channels according to the present disclosure.

Referring to FIG. 16, a terminal may communicate with another terminal or a base station through an antenna 301, and may have a configuration for communicating with the base station. For example, the terminal may comprise a downlink radio frequency (RF) unit, a downlink analog-to-digital converter (ADC) unit 312, and a downlink path loss measurement unit 313.

FIG. 16 illustrates only components necessary for direct communication between terminals according to the present disclosure. Therefore, components related to uplink transmission are omitted.

The downlink RF unit 311 may receive a downlink RF signal from the base station through the antenna 301, convert it into a baseband signal, and output a baseband analog signal. The downlink ADC unit 312 may convert the baseband analog signal into a digital signal, and output the digital signal. The downlink path loss measurement unit 313 may measure a downlink path loss from the signal received through the antenna and converted into the digital signal. Such path loss measurement may be measured based on various methods, and the present disclosure is not limited to one specific method.

In addition, the terminal may have components for uplink transmission in order to communicate with the base station. In the following description, a base station communication unit may include the downlink RF unit 311, the downlink ADC unit 312, and the downlink path loss measurement unit 313 illustrated in FIG. 16. In addition, the base station communication unit may further include components for uplink transmission. In addition, the base station communication unit may further include a modem for demodulating and decoding a signal received from the base station or a communication processor (CP) for performing functions of the modem.

Hereinafter, components necessary for sidelink communication included in the terminal will be described.

In order to receive a signal from another terminal during sidelink communication, the terminal may comprise a sidelink RF reception unit 321, a sidelink ADC unit 322, a sidelink path loss measurement unit 323, a sidelink synchronization detection unit 324, and a sidelink feedback detection unit 325. In the present disclosure, the sidelink RF reception unit 321, the sidelink ADC unit 322, the sidelink path loss measurement unit 323, the sidelink synchronization detection unit 324, and the sidelink feedback detection unit 325 may collectively referred to as a 'sidelink receiver'.

The sidelink RF reception unit 321 may receive a sidelink RF signal from another terminal through the antenna 301, convert it into a baseband signal, and output it as a baseband analog signal. The sidelink ADC unit 322 may convert the baseband analog signal into a digital signal and output the digital signal. The sidelink path loss measurement unit 323 may measure a sidelink path loss for the signal received through the antenna and converted into the digital signal. Such path loss measurement may be measured based on various methods, and the present disclosure is not limited to one specific method. The sidelink synchronization detection unit 324 may detect a sidelink synchronization signal transmitted from another terminal, synchronize with another terminal by using the detected synchronization signal, and use the acquired synchronization for sidelink communication. The sidelink feedback detection unit 325 may detect a feedback signal from another terminal participating in the sidelink communication.

In addition, in order to receive a signal to another terminal during sidelink communication, the terminal may comprise a sidelink data channel transmission unit 334, a sidelink control channel transmission unit 335, and a sidelink digital-to-analog converter (DAC) unit 333, a sidelink power control unit 332, and a sidelink RF transmission unit 331. In the present disclosure, the sidelink data channel transmission unit 334, the sidelink control channel transmission unit 335, the sidelink DAC unit 333, the sidelink power control unit 332, and the sidelink RF transmission unit 331 may be collectively referred to as a 'sidelink transmitter'.

The sidelink data channel transmission unit 334 may process user data to be transmitted according to a sidelink communication protocol, map it to a data channel, and output the data channel. The sidelink control channel transmission unit 335 may output control information to be multiplexed with the data channel or map control information to be separately transmitted to a control channel. The sidelink DAC unit 333 may convert a digital signal input from the sidelink control channel transmission unit 335 and/or the sidelink data channel transmission unit 334 into an analog signal and output the analog signal. The sidelink power control unit 332 may amplify and output the control channel and/or data channel so that the channel has a transmit power that can be transmitted to another terminal participating in sidelink communication, according to a control a sidelink transmit power determination unit 326 to be described later. The sidelink RF transmission unit 331 may up-convert each power-amplified channel into a RF signal and transmit it to other terminals participating in sidelink communication through the antenna 301.

Meanwhile, although a feedback transmission unit is not separately illustrated in FIG. 16, the sidelink transmitter may further include the feedback transmission unit. The feedback transmission unit may generate an ACK/NACK signal to be transmitted to a transmitting terminal, or may or may not generate an ACK signal in response to demodulation and decoding results when receiving a control channel and/or receiving a data channel through the sidelink. When the feedback transmission unit generates the response signal to be transmitted, it may be fed back to the transmitting terminal through the same path as the sidelink control channel transmission unit 335 or the sidelink data channel transmission unit 334.

In addition, the terminal may include a sidelink transmission determination unit 327, a sidelink transmit power determination unit 326, and a sidelink control unit 302 to control the sidelink communication. The sidelink transmission determination unit 327 and the sidelink transmit power determination unit 326 may be implemented as being integrated into the sidelink control unit 302 according to an implementation scheme. In addition, the role of the sidelink control unit 302 may be performed by a part of a communication processor including a modem, and may be implemented with the communication processor in a form including a control logic for operations of the sidelink transmission determination unit 327 and the sidelink transmit power determination unit 326, which will be described later. In FIG. 16 according to the present disclosure, in order to distinguish and describe the features of each function, it is exemplified as functionally separated.

The sidelink transmission determination unit 327 may control outputs of the sidelink data channel transmission unit 334 and/or the sidelink control channel transmission unit 335 based on information received from the sidelink feedback detection unit 325. In the case of using the method described with reference to FIGS. 7 and 8, a transmission may be determined according to whether a response signal is ACK or NACK. According to FIG. 9, it is possible to determine whether to perform sidelink transmission based on a response signal to whether the control channel has been successfully received. As another example, based on the content described in FIGS. 14 and 15 above, if the transmitting terminal receives ACK as a feedback for the control channel when communicating with a plurality of receiving terminals, the sidelink transmission determination unit 327 may control data to be output through the sidelink data channel transmission unit 334 and the sidelink control channel transmission unit 335. On the other hand, if the transmitting terminal does not receive any signal as a feedback for the control channel when communicating with a plurality of receiving terminals, the sidelink transmission determination unit 327 may block the sidelink data channel transmission unit 334, and may control data to be output only through the sidelink control channel transmission unit 335.

In addition, the sidelink transmit power determination unit 326 may determine a transmit power by utilizing a downlink path loss measured using a signal received from the base station communication unit, and a sidelink path loss measured by the sidelink receiver. Such the transmit power may be determined according to the method described in FIGS. 10A and 10B, FIGS. 12A and 12B, or FIGS. 13A and 13B. In particular, when the sidelink transmit power determination unit 326 determines a transmit power for a sidelink control channel, information from the sidelink feedback detection unit 325 may be utilized. Accordingly, the sidelink transmit power determination unit 326 may store the preset power increment described above.

The sidelink control unit 302 may perform control on the functional blocks or the operations of the transmitting terminal using the transmit power ramping method for control channels according to the exemplary embodiments of the present disclosure.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A sidelink communication method performed by a first terminal, the sidelink communication method comprising:
    determining a first power value of a first control channel for transmitting control information for sidelink communication based on open-loop power control;
    transmitting the control information on the first control channel having the first power value;
    in response to receiving a response signal corresponding to the control information, determining a second power value of a first data channel for transmitting data; and
    transmitting a second control channel and the first data channel in one predetermined slot for the sidelink communication,
    wherein a third power value of the second control channel and the second power value of the first data channel are determined based on at least a power value of the first control channel.

2. The sidelink communication method according to claim 1, wherein the second power value and the third power value are determined by further using open-loop power control information at a time of transmitting the first data channel.

3. The sidelink communication method according to claim 1, further comprising transmitting the control information on a third control channel until a preset condition is satisfied when the response signal corresponding to the control information is not received, wherein a power value of the third control channel is increased by a predetermined value from the power value of the first control channel.

4. The sidelink communication method according to claim 3, wherein the preset condition includes a number of transmissions of a control channel.

5. The sidelink communication method according to claim 3, wherein the power value of the third control channel is determined as a preset power value when the power value of the third control channel exceeds a preset maximum power in increasing the power value of the third control channel.

6. The sidelink communication method according to claim 1, wherein the response signal corresponding to the control information includes at least one of acknowledgment (ACK) indicating success of demodulation and decoding of the control information, or no signal indicating failure of demodulation and decoding of the control information.

7. The sidelink communication method according to claim 6, wherein in case of the no signal, the third power value is increased by a predetermined value.

8. A first terminal for sidelink communication, comprising:
- a sidelink receiver for receiving a sidelink signal from another terminal;
- a sidelink transmitter for transmitting a sidelink signal to another terminal; and
- a controller comprising at least one processor,
- wherein the controller is configured to:
- determine a first power value of a first control channel for transmitting control information for sidelink communication based on open-loop power control;
- control the sidelink transmitter to transmit the control information on the first control channel having the first power value;
- in response to receiving a response signal corresponding to the control information through the sidelink receiver, determine a second power value of a first data channel for transmitting data; and
- control the sidelink transmitter to transmit a second control channel and the first data channel in one predetermined slot for the sidelink communication,
- wherein a third power value of the second control channel and the second power value of the first data channel are determined based on at least a power value of the first control channel.

9. The first terminal according to claim 8, wherein the controller is configured to determine the second power value and the third power value by further using open-loop power control information at a time of transmitting the first data channel.

10. The first terminal according to claim 8, wherein the controller is further configured to:
- control the sidelink transmitter to transmit the control information on a third control channel until a preset condition is satisfied when the response signal corresponding to the control information is not received, and
- increase a power value of the third control channel by a predetermined value from the power value of the first control channel.

11. The first terminal according to claim 10, wherein the preset condition includes a number of transmissions of a control channel.

12. The first terminal according to claim 10, wherein the controller is further configured to determine the power value of the third control channel as a preset power value when the power value of the third control channel exceeds a preset maximum power in increasing the power value of the third control channel.

13. The first terminal according to claim 8, wherein the response signal corresponding to the control information includes at least one of acknowledgment (ACK) indicating success of demodulation and decoding of the control information, or no signal indicating failure of demodulation and decoding of the control information.

14. The first terminal according to claim 13, wherein in case of the no signal, the third power value is increased by a predetermined value.

* * * * *